US011564230B2

(12) United States Patent
Moon et al.

(10) Patent No.: US 11,564,230 B2
(45) Date of Patent: Jan. 24, 2023

(54) METHOD AND APPARATUS FOR SUPPORTING FULLY-DISTRIBUTED TIME-SENSITIVE NETWORKING IN MOBILE COMMUNICATION SYSTEM

(71) Applicant: Samsung Electronics Co., Ltd., Gyeonggi-do (KR)

(72) Inventors: Sangjun Moon, Gyeonggi-do (KR); Kisuk Kweon, Gyeonggi-do (KR); Yoonseon Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 87 days.

(21) Appl. No.: 17/141,718

(22) Filed: Jan. 5, 2021

(65) Prior Publication Data

US 2021/0212069 A1 Jul. 8, 2021

(30) Foreign Application Priority Data

Jan. 6, 2020 (KR) ........................ 10-2020-0001737

(51) Int. Cl.
*H04W 28/02* (2009.01)
*H04W 80/10* (2009.01)
(Continued)

(52) U.S. Cl.
CPC ..... *H04W 72/0493* (2013.01); *H04W 72/042* (2013.01); *H04W 72/0446* (2013.01);
(Continued)

(58) Field of Classification Search
None
See application file for complete search history.

(56) References Cited

U.S. PATENT DOCUMENTS 10,904,947 B2 * 1/2021 Li ........................... H04L 12/14
2018/0270778 A1 * 9/2018 Bharatia ............. H04L 65/1073
(Continued)

FOREIGN PATENT DOCUMENTS

CN 110536376 12/2019
EP 3879879 A1 * 9/2021 ............. H04L 47/20

OTHER PUBLICATIONS

"IEEE Standard for Local and Metropolitan Area Networks—Bridges and Bridged Networks—Amendment 31: Stream Reservation Protocol (SRP) Enhancements and Performance Improvements," in IEEE Std 802.1Qcc-2018 (Amendment to IEEE Std 802.1Q-2018 as amended by IEEE Std 802.1Qcp-2018), pp. 1-208, Oct. 31, 2018, doi: 10.1109/IEEESTD.2018.8514112.

(Continued)

*Primary Examiner* — Sai Aung
(74) *Attorney, Agent, or Firm* — The Farrell Law Firm, P.C.

(57) ABSTRACT

A method and an apparatus for supporting TSN in a wireless communication network are disclosed. The method for supporting fully-distributed time-sensitive networking (TSN) by a user plane function in a mobile communication system includes receiving a first status frame through a user equipment (UE) connected to a first TSN node, the first status frame including at least one of information about the first TSN node, information about a second TSN node for transmitting a data frame, stream information for transmitting data, and accumulated latency information; transmitting an update request for service quality (QoS) setup to a TSN application function (TSN AF) through a PDU session update procedure for the UE based on the received first status frame; and updating the first status frame upon receiving QoS setup information from the TSN AF, wherein the QoS setup information may include at least one of (Continued)

accumulated latency designated by the TSN AF, the status of the first TSN node, and the status of the second TSN node.

15 Claims, 22 Drawing Sheets

(51) Int. Cl.
    *H04W 72/04* (2009.01)
    *H04W 72/06* (2009.01)
    *H04W 72/10* (2009.01)
    *H04W 72/08* (2009.01)
(52) U.S. Cl.
    CPC ......... *H04W 72/06* (2013.01); *H04W 72/085* (2013.01); *H04W 72/10* (2013.01)

(56) References Cited

U.S. PATENT DOCUMENTS

| | | | |
|---|---|---|---|
| 2019/0254057 A1 | 8/2019 | Hampel et al. | |
| 2019/0289616 A1 | 9/2019 | Hampel et al. | |
| 2019/0306251 A1* | 10/2019 | Talebi Fard | H04W 76/10 |
| 2019/0335534 A1* | 10/2019 | Atari | H04M 15/66 |
| 2021/0345193 A1* | 11/2021 | Miklós | H04W 36/12 |
| 2021/0359778 A1* | 11/2021 | Wang | H04L 69/28 |

OTHER PUBLICATIONS

"IEEE Standard for Local and Metropolitan Area Networks—Timing and Synchronization for Time-Sensitive Applications in Bridged Local Area Networks," in IEEE Std 802.1AS-2011, pp. 1-292, Mar. 30, 2011, doi: 10.1109/IEEESTD.2011.5741898.

"IEEE Draft Standard for Local and Metropolitan Area Networks—Timing and Synchronization for Time-Sensitive Applications," in IEEE P802.1AS-Rev/D6.0 Dec. 2017 pp. 1-496, Feb. 9, 2018.

3rd Generation Partnership Project; Technical Specification Group Services and System Aspects; Study on enhancement of 5G System (5GS) for Vertical and Local Area Network (LAN) Services (Release 16), 3GPP TR 23.734 V16.2.0, Jun. 2019, 117 pages.

3rd Generation Partnership Project; Technical Specification Group Services and System Aspects; Study on Enhancements for Cyber-Physical Control Applications in Vertical Domains; Stage 1 (Release 17), 3GPP TR 22.832 V17.1.0, Dec. 2019, 91 pages.

Qualcomm Incorporated, "TSN Time Synchronization Solutions: Down-Selection", S2-1903326, 3GPP TSG-SA WG2 Meeting #132, Apr. 8-12, 2019, 8 pages.

International Search Report dated Apr. 7, 2021 issued in counterpart application No. PCT/KR2021/000031, 3 pages.

European Search Report dated Nov. 25, 2022 issued in counterpart application No. 21738052.6-1213, 9 pages.

* cited by examiner

Fully-Centralized Model

Fully-Distributed Model

METHOD AND APPARATUS FOR SUPPORTING FULLY-DISTRIBUTED TIME-SENSITIVE NETWORKING IN MOBILE COMMUNICATION SYSTEM

CROSS-REFERENCE TO RELATED APPLICATION(S)

This application is based on and claims priority under 35 U.S.C. § 119 to Korean Patent Application No. 10-2020-0001737, filed on Jan. 6, 2020, in the Korean Intellectual Property Office, the entire disclosure of which is incorporated herein by reference.

BACKGROUND

1. Field

The disclosure generally relates to a method and an apparatus for supporting time-sensitive networking (TSN) in a wireless communication network.

2. Description of Related Art

To meet the increased demand for wireless data traffic since the deployment of 4G communication systems, efforts have been made to develop an improved 5G or pre-5G communication system. The 5G or pre-5G communication system is also called a "beyond 4G network" or a "post long term evolution (LTE) System".

The 5G communication system is being implemented in higher frequency (mmWave) bands, e.g., 60 GHz bands, so as to accomplish higher data rates. To decrease propagation loss of the radio waves and increase the transmission distance, the beamforming, massive multiple-input multiple-output (mMIMO), full dimensional MIMO (FD-MIMO), array antenna, an analog beam forming, and large scale antenna techniques are discussed in 5G communication systems.

In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system, and requires satisfying ultrahigh reliability (e.g., packet error rate of about 10-5) and low latency (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet is now evolving to the Internet of things (IoT) where distributed entities, such as things, exchange and process information without human intervention. The Internet of everything (IoE), which is a combination of IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently under research.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered an example of convergence of the 5G technology with the IoT technology.

Meanwhile, there has been ongoing discussion regarding time-sensitive networking (TSN) in connection with mobile communication networks. It is expected that such TSN will be mainly used in fields related to audio/video applications or factory automation.

Methods for setting a path between TSN nodes for traffic delivery and allocating resources in connection with the TSN include a fully-centralized model and a fully-distributed model. 3GPP networks can support the fully-centralized TSN model only, and cannot support the fully-distributed TSN model.

SUMMARY

The present disclosure has been made to address the above-mentioned problems and disadvantages, and to provide at least the advantages described below.

The disclosure provides an apparatus and a method for supporting the fully-distributed TSN model.

According to an embodiment, a method for supporting fully-distributed time-sensitive networking (TSN) by a user plane function in a mobile communication system is provided. The method includes receiving a first status frame through a user equipment (UE) connected to a first TSN node, the first status frame including at least one of information about the first TSN node, information about a second TSN node for transmitting a data frame, stream information for transmitting data, and accumulated latency information; transmitting an update request for quality of service (QoS)

setup to a TSN application function (TSN AF) through a packet data unit (PDU) session update procedure for the UE based on the received first status frame; and updating the first status frame upon receiving QoS setup information from the TSN AF. The QoS setup information may include at least one of accumulated latency designated by the TSN AF, the status of the first TSN node, and the status of the second TSN node.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like, are illustratively used for the sake of convenience. Therefore, the disclosure is not limited by the terms as used below, and other terms referring to subjects having equivalent technical meanings may be used.

In the following description, the disclosure will be described using terms and names defined in the 5GS (5th generation standard) and new radio (NR) standards, which are the latest standards defined by the 3rd generation partnership project (3GPP) group among existing communication standards, for the convenience of description. However, the disclosure is not limited by these terms and names, and may be applied in the same way to systems that conform other standards. Especially, the disclosure may be applied to the 3GPP 5GS/NR (5th generation mobile communication standard).

Time-sensitive networking (TSN) is a set of standards related to time synchronization, low latency, resource management, and reliability improvement for supporting audio/video streaming and/or factory automation. Methods for supporting TSN in 3GPP networks are disclosed herein.

3GPP networks support only the fully-centralized TSN model, and thus cannot effectively transmit TSN traffic in an environment that supports the fully-distributed TSN model only. According to the disclosure, TSN traffic can be effectively transmitted even in an environment in which 5G supports only the fully-distributed TSN model, among 3GPP networks.

Figure 1A:
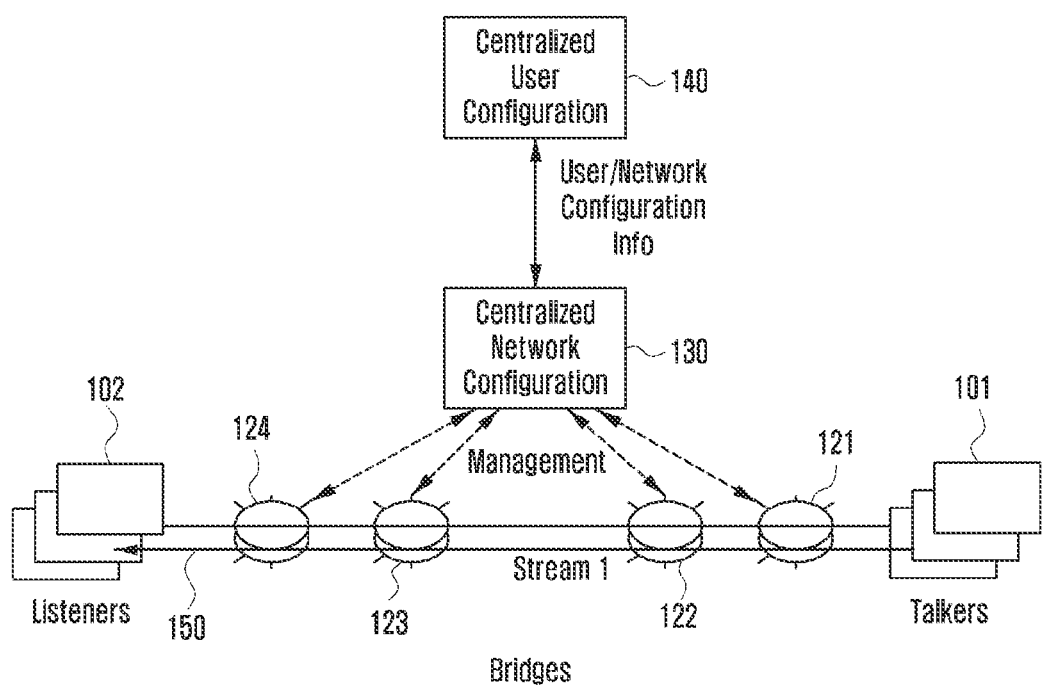
FIG. 1A illustrates a fully-centralized model among resource management methods of TSN.
Figure 1B:
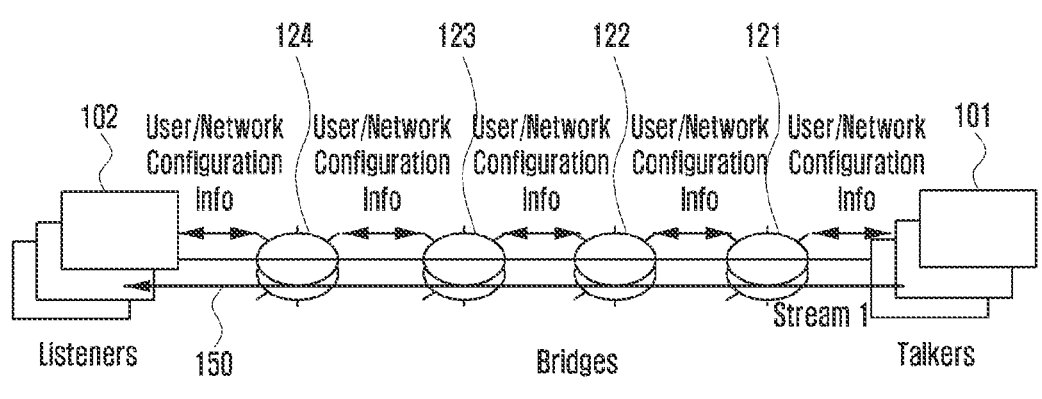
FIG. 1B illustrates a fully-distributed model among resource management methods of TSN.

FIG. 1A illustrates a fully-centralized model among resource management methods of TSN, and FIG. 1B illustrates a fully-distributed model among resource management methods of TSN.

Audio/video or factory automation applications frequently transmit and receive consecutive messages of a small size. In TSN, consecutive messages that are periodically generated are called a stream. A TSN node that generates a stream is referred to as a speaker or a talker and is indicated by reference numeral 101 in both FIG. 1A and FIG. 1B. A TSN node that receives and uses a stream is referred to as a hearer or a listener and is indicated by reference numeral 102 in both FIG. 1A and FIG. 1B. In order to forward a stream from the talker 101 to the listener 102 within a secured delay of a certain time, TSN needs to determine a path before forwarding the stream and to allocate a resource on the determined path. An overall operation of determining a path and allocating a resource on the path is referred to as resource management.

Resource management methods include a fully-centralized model (FIG. 1A) and a fully-distributed model (FIG. 1B). In TSN, one suitable method may be selected from the fully-centralized model and the fully-distributed model depending on environments of a network and an application. In an environment in which a network has a large scale and has infrequent changes in configuration, a fully-centralized TSN model as illustrated in FIG. 1A, is suitable. However, in an environment in which a network has a small scale or may have frequent changes in configuration, a fully-distributed TSN model as illustrated in FIG. 1B, is suitable.

In the fully-centralized model, a central server that collects and manages stream requirements from the talker 101 and the listener 102 is referred to as a centralized user configuration (CUC) 140. Further, anode functioning to transmit traffic in TSN is referred to as a bridge, and FIG. 1A shows four bridges 121, 122, 123, and 124. A server that collects information from the bridges 121, 122, 123, and 124 and is in charge of configuring the bridges is referred to as a centralized network configuration (CNC) 130. The CNC 130 receives the stream requirements from the CUC 140 and determines an optimal path for each stream and a resource needed for each bridge on the path based on the collected information, such as information about connection between the bridges and the status of the resource for each bridge. The CNC 130 may report determined resource allocation information, specifically, input/output ports for supporting each stream and schedule information about received traffic, to each bridge. Each bridge may allocate a resource, such as a bandwidth, accordingly.

In the fully-distributed model illustrated in FIG. 1B, since there is neither the CUC 140 that collects and manages requirements from the talker 101 and the listener 102 nor the CNC 130 that collects and manages connection information or resource status from the bridges 121, 122, 123, and 124, each talker 101, each listener 102, and bridges 121, 122, 123, and 124 may determine a path for each stream and may allocate a resource through a process of exchanging information using a stream reservation protocol (SRP).

Figure 2A:
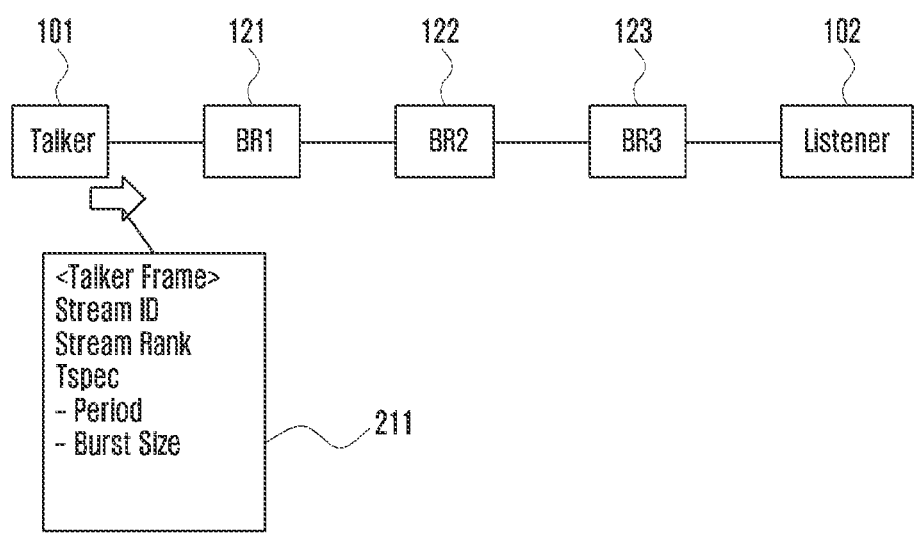
FIG. 2A illustrates the operation of a fully-distributed model as a resource management method of TSN.
Figure 2B:
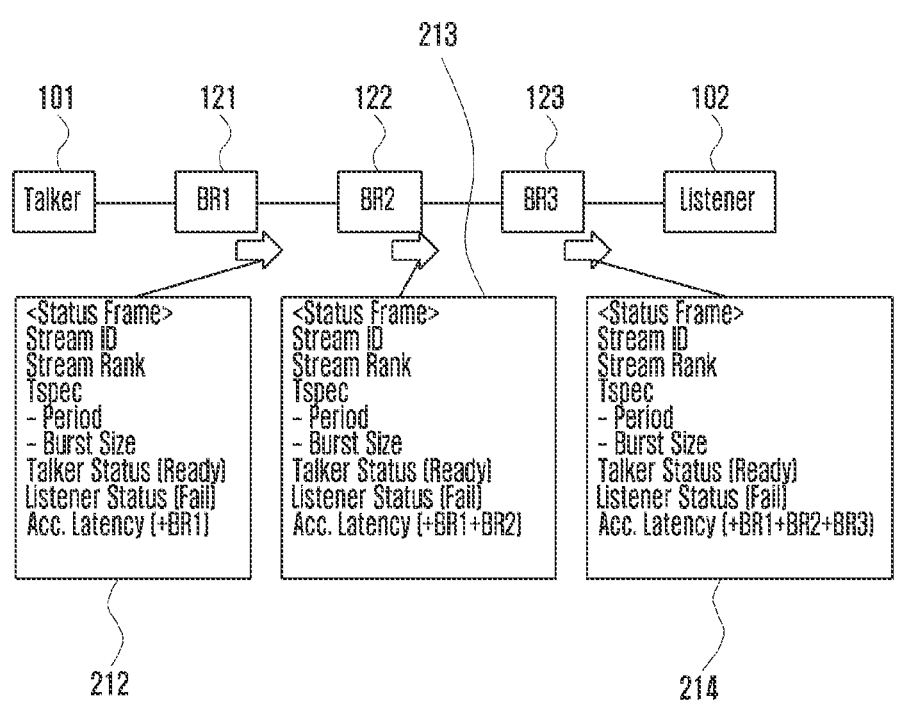
FIG. 2B illustrates the operation of a fully-distributed model as a resource management method of TSN.
Figure 2C:
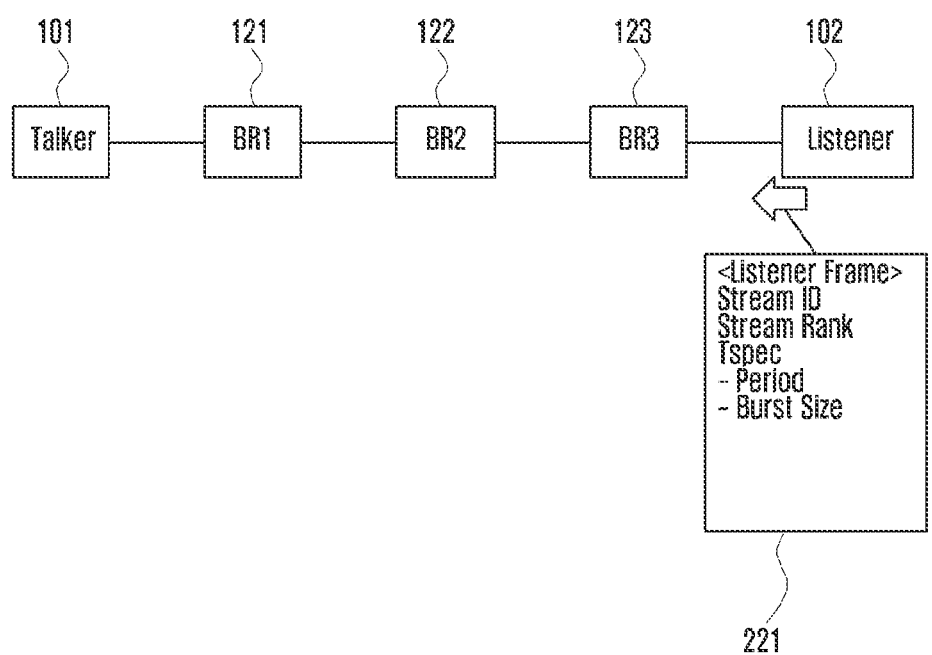
FIG. 2C illustrates the operation of a fully-distributed model as a resource management method of TSN.
Figure 2D:
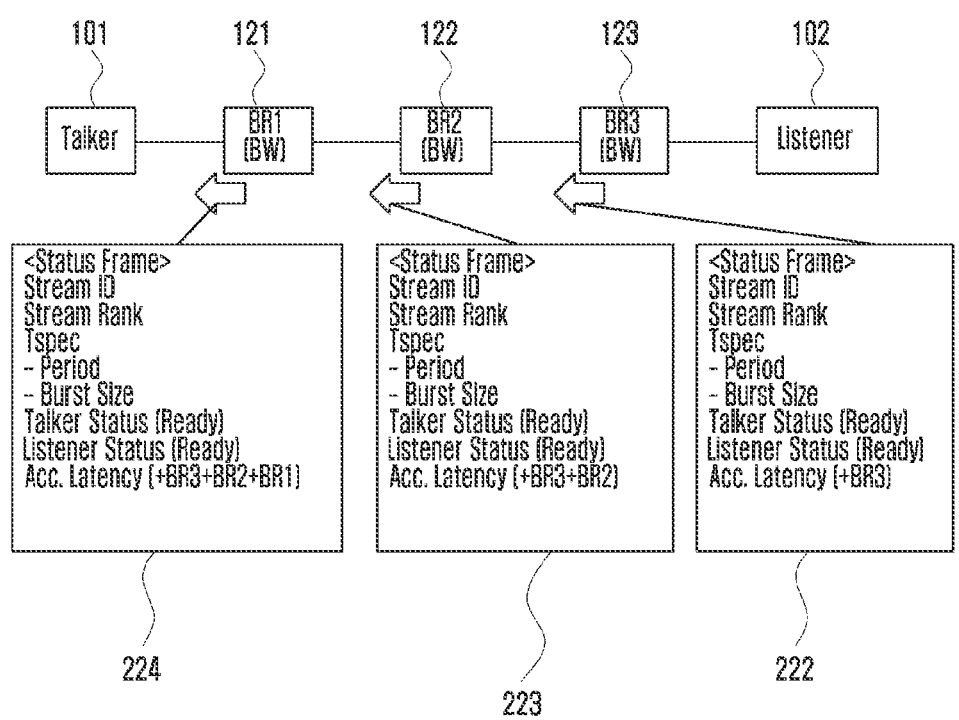
FIG. 2D illustrates the operation of a fully-distributed model as a resource management method of TSN.

FIG. 2A illustrates the operation of a fully-distributed model as a resource management method of TSN, FIG. 2B illustrates the operation of a fully-distributed model as a resource management method of TSN, FIG. 2C illustrates the operation of a fully-distributed model as a resource management method of TSN, and FIG. 2D illustrates the operation of a fully-distributed model as a resource management method of TSN.

Referring to FIG. 2A to FIG. 2D, in the fully-distributed model, a talker 101, bridges 121, 122, and 123, and a listener 102 may mutually operate according to an SRP.

First, as illustrated in FIG. 2A, the talker 101 may generate a talker frame 211 including information about a stream to be transmitted by the talker 101 and may transmit the talker frame to neighboring nodes. The information included in the talker frame 211 may include a stream identifier (ID), a stream rank, and specific traffic information (Tspec). The stream ID is the unique identifier of the stream to be transmitted. The stream rank denotes the relative priority of the stream and may be used in a process of allocating resources for a plurality of streams. Tspec is derived from traffic specification, denotes a unique feature of traffic, and may include a period and/or the burst size of the stream. The period refers to a generation period in which messages are periodically and consecutively generated. The burst size of the stream indicates the size of the messages, that is, the size of the stream that can be transmitted at a particular time. The burst size of the stream may include information about the number of messages present whenever the stream is generated, about the maximum size of each message in bytes, and the like.

Next, as illustrated in FIG. 2B, the bridges 121, 122, and 123 may generate a status frame by recording status information observed by the bridges per stream and may transmit the status frame to neighboring nodes. The status frame may include a stream ID, a stream rank, and Tspec, which are initially received information, and a talker status, a listener status, and accumulated latency, which are generated by the bridges. The stream ID, the stream rank, and Tspec are the same as those described above in the talker frame 211. The talker status records a status according to whether there is a talker. For example, in FIG. 2B, since bridge BR1 121 has received the talker frame, the talker status is indicated as Ready. Likewise, the listener status indicates whether there is a listener. When there is at least one listener, the listener status may be indicated as Ready, and when there is no listener, the listener status may be indicated as Fail. The accumulated latency may indicate expected maximum latency time. For example, bridge BR1 121 may add BR 1 including internal latency time thereof and expected latency time between links. Subsequently, bridge BR2 122 as the second bridge may add BR 2, which is additional latency time expected by bridge BR2, to BR 1. Bridge BR3 123 as the last bridge may add BR3, which is latency time expected by bridge BR3, to BR 2.

The information of the status frame may be finally transmitted to the listener 102 through bridge BR3 123. The listener 102 may obtain the stream ID, the stream rank, Tspec, and the accumulated latency from the information of the status frame received from bridge BR3 123. The listener 102 may also obtain the information of the talker status from the information of the status frame transmitted from the last bridge BR3 123.

Next, as illustrated in FIG. 2C, the listener 102 may generate a listener frame 221 and may transmit the listener frame 221 to the talker 101 through the nodes from which the listener 102 receives the status frame in order to declare that the listener 102 has received and uses the stream. Before generating and transmitting the listener frame, the listener 102 may identify the expected latency time of the stream to be received by the listener 102 using the accumulated latency of the stream and may determine whether to receive the stream.

Information included in the listener frame 221 may be the ID of the stream determined to be received (stream ID), the rank of the stream determined to be received (stream rank), specific information (Tspec), and the like. The stream ID is the unique identifier of the stream determined to be received from the talker 101. The stream rank may be the relative priority of the stream determined to be received from the talker 101. Tspec may include a period and/or the burst size of the stream.

Next, as illustrated in FIG. 2D, each of the bridges 123, 122, and 121 may update the information about the stream of the listener frame 221 to generate a status frame and may transmit the status frame to the talker 101. The status frame may include information, such as a stream ID, a stream rank, Tspec, a talker status, a listener status, and accumulated latency, which are the same as described above with reference to FIG. 2B. The stream ID, the stream rank, Tspec, and the talker status are the same as described above with reference to FIG. 2B. The accumulated latency may record maximum latency time expected by each bridge as in FIG. 2B. However, unlike in FIG. 2B, in FIG. 2D, since the bridges know the existence of the listener 101, the listener status is indicated as Ready. Further, the bridges may allocate a resource, such as a bandwidth, in order to support the stream. When the bridges fail to allocate a resource in this process, the bridges may add an additional Fail field describing a cause of the failure to the status frame. When the bridges succeed in allocating a resource, the bridges may transmit the status frame to the talker 101. Through this process, path configuration and resource allocation between the talker 101 and the listener 102 may be performed.

For example, bridge BR3 123 may allocate a resource for transmitting a stream to be received from bridge BR2 122 to the listener 102, bridge BR2 122 may allocate a resource for transmitting a stream to be received from bridge BR1 121 to bridge BR3 123, and bridge BR1 121 may allocate a resource for transmitting a stream to be received from the talker 101 to bridge BR2 122. When receiving the status frame from bridge BR1 121, the talker 101 may recognize that the talker 101 can transmit the stream to the listener 102 with guaranteed accumulated latency.

Figure 3A:
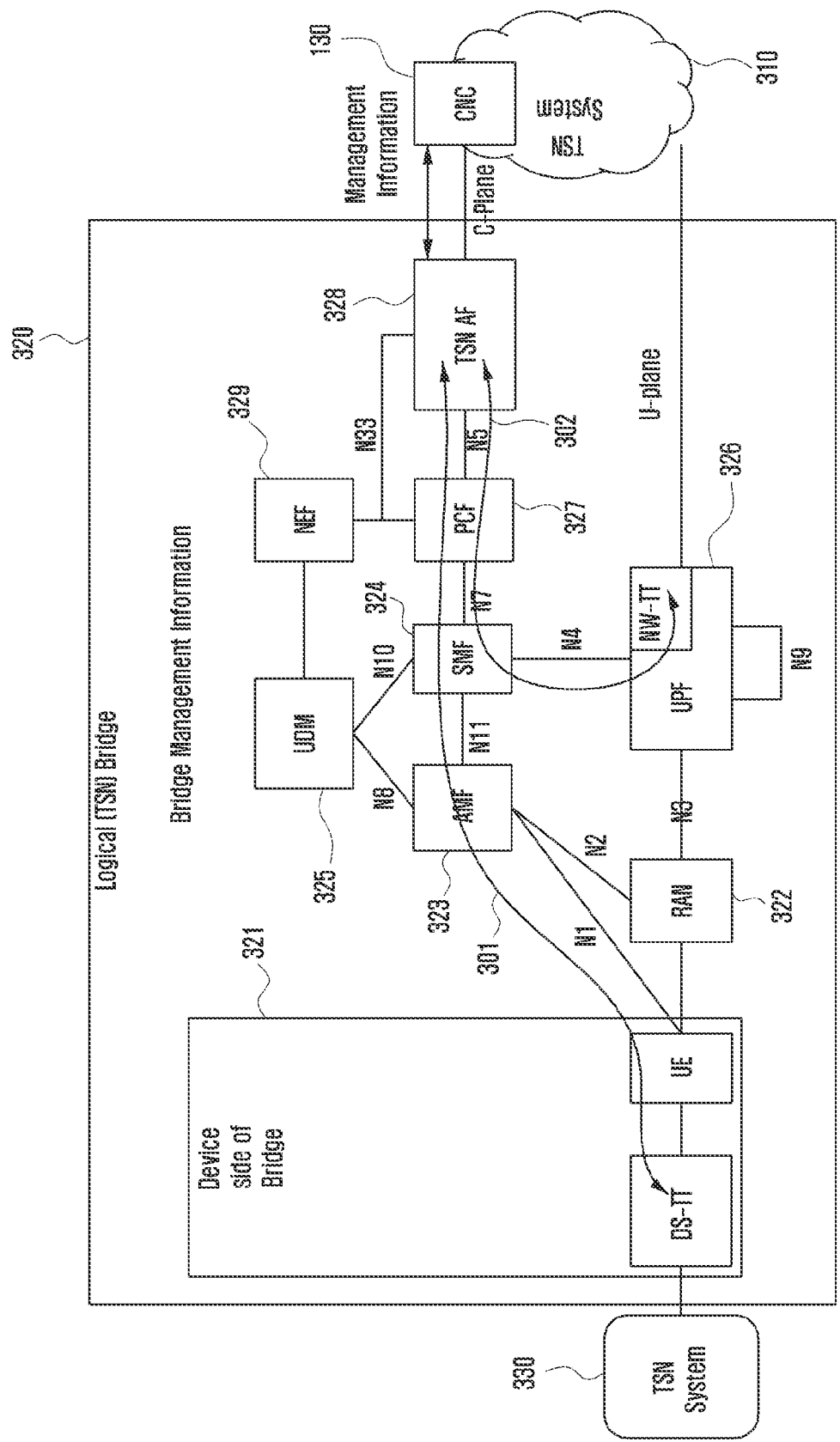
FIG. 3A illustrates the structure of a 3GPP network interworking with a fully-centralized model of TSN.

FIG. 3A illustrates the structure of a 3GPP network interworking with a fully-centralized model of TSN.

Referring to FIG. 3A, a second TSN system 310 may include a CNC 130. A wireless communication network 320 may operate as one TSN bridge. Here, the wireless communication network may be a 3GPP network as described above and, in particular, may be a network according to the 5G or NR standard. However, the disclosure is not limited to the above examples, and other wireless networks may be equally applied when including functions described herein.

FIG. 3A illustrates a case where the wireless communication network 320 is positioned between the second TSN system 310 and a first TSN system 330 to operate as one TSN bridge. A 5G core network may include the following network functions. Each network function may be one network node. One network node may be a physical or/and logical entity or may be configured together with another specific node. Each network function may be configured as a specific device. In another example, each network function may be configured as a combination of a device and software. In still another example, each network function may be configured as software in a device on a specific collective network. Hereinafter, each network function is referred to as a "~ function." The network functions of the core 5G network are described below.

The wireless communication network 320 may include a terminal 321 of the bridge, and in the case of a terminal of the 3GPP network, a user equipment (UE) and a device-side TSN translator (DS-TT) may be included. The DS-TT may also be referred to as a TSN translator, may be configured as physical hardware, and may be driven in an application of the UE or a communication processor (CP). In another example, the DS-TT has separate hardware and may be controlled by an application of the UE or a lower layer of the application. The DS-TT may perform a necessary function when a 5GS interworks with TSN through an Ethernet protocol. For example, the DS-TT may process a synchronization frame or may perform a link layer discovery protocol (LLDP) operation. The UE may be a device including a wireless communication unit to transmit and receive a control signal and data to and from the 5G network and a controller (generally, an application processor) to control the wireless communication unit.

An RAN 322 may be a base station of the 5G network. Therefore, the terminal 321 and the RAN 322 may transmit and receive data and a control signal using a 5G radio channel. A user plane function (UPF) 326 serves as a gateway forwarding a packet transmitted or received by the terminal 321. The UPF 326 may be a PDU session anchor (PSA) UPF that serves as an anchor of a PDU session connected to a data network. All data transmitted by the terminal (or UE) to the data network is transmitted through this anchor UPF. A data packets to a centralized data network or Internet data network is forwarded to the PSA UPF of a corresponding PDU session.

An access and mobility management function (AMF) 323 may perform a network function of managing the mobility of the terminal. A session management function (SMF) 324 may perform a network function of managing a packet data network connection provided for the terminal or (UE). This connection may be as a protocol data unit (PDU) session, A policy and charging function (PCF) 327 may perform a network function of applying a mobile network operator's service policy, charging policy, and policy for a PDU session on the terminal 321. A unified data management (UDM) 325 may perform a network function of storing information about a subscriber. A network exposure function (NEF) 329 can access information for managing the terminal 321 in the 5G network, thus subscribing to a mobility management event of the terminal, subscribing to a session management even of the terminal, requesting session-related information, configuring charging information about the terminal, and requesting a change of a PDU session policy on the terminal.

Each of the DS-TT/UE 321 and the network-side TSN translator (NW-TT)/UPF 326 operates as a port of the 5GS logical bridge and may exchange management information with a TSN application function (TSN AF) 328 by applying a PDU session establishment/modification process or the like. Here, the NW-TT may be in charge of some functions of the relevant Ethernet protocol required for the 5GS to support TSN and may perform interpretation and processing of a synchronization frame, port information management, collection and management of neighboring node information through the LLDP, and the like.

The TSN AF 328 serves to exchange management information between the 5GS logical bridge and the CNC 130 of TSN. The DS-TT or NW-TT is in charge of interworking between the 5GS and TSN using the Ethernet protocol, while the TSN AF 328 may be in charge of interworking between the 5GS and TSN using a management protocol, such as a simple network management protocol (SNMP).

In FIG. 3A, reference numeral 301 denotes a data transmission path between the DS-TT/UE 321 and the TSN AF 328 using the PDU session establishment/modification process, and reference numeral 302 denotes a data transmission path between the NW-TT/UPF 326 and the TSN AF 328 using a session report and the PDU session establishment/modification process. Data transmitted to the DS-TT of the terminal 321 through the path indicated by reference numeral 301 may be provided to the TSN system 330.

Figure 3B:
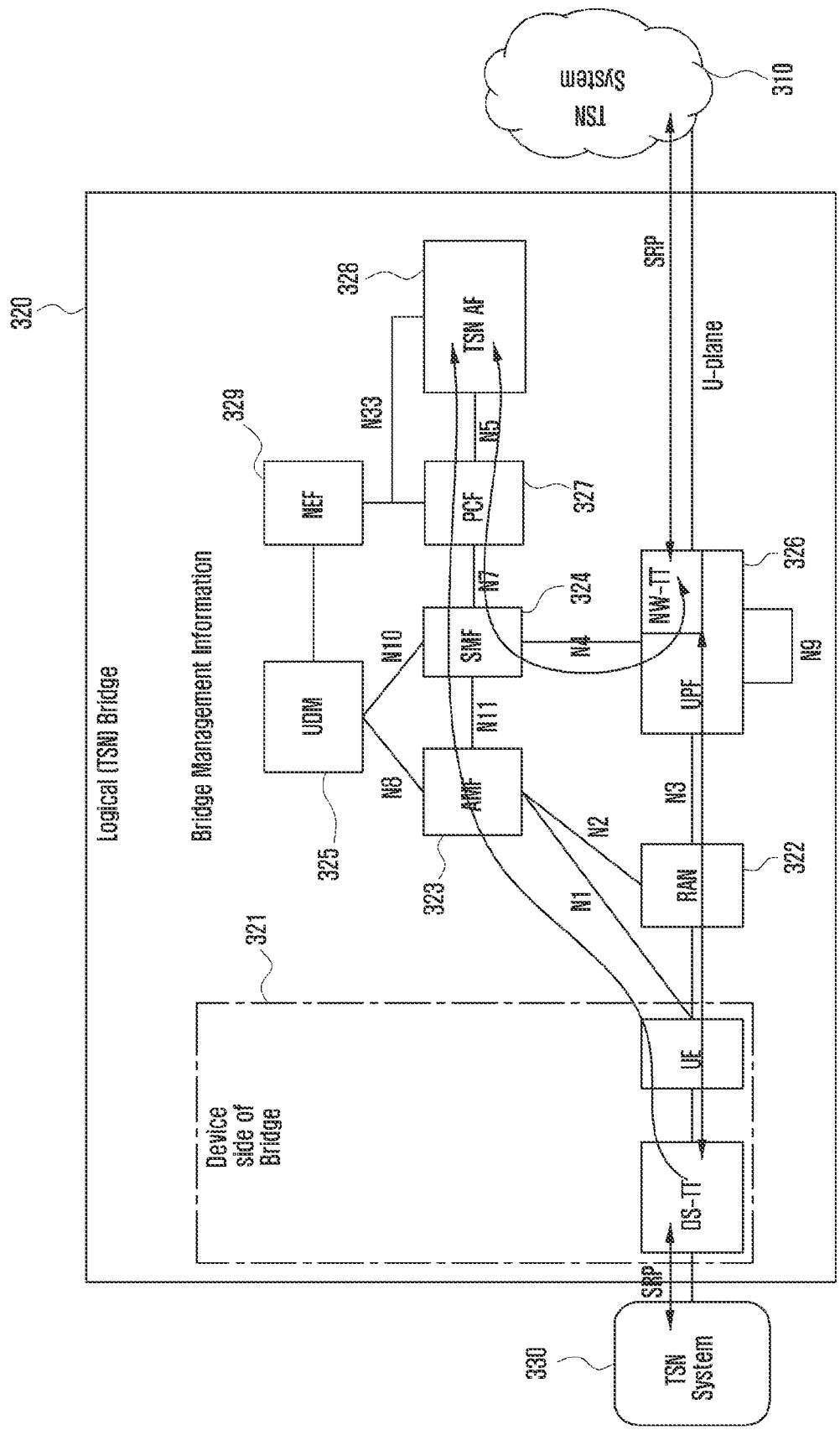
FIG. 3B illustrates the structure of a 3GPP network interworking with a fully-distributed model of TSN according to an embodiment.

FIG. 3B illustrates the structure of a 3GPP network interworking with a fully-distributed model of TSN according to an embodiment.

Comparing FIG. 3A and FIG. 3, since the CNC 130 is included in FIG. 3A, the TSN AF 328 receives control information and data through the CNC 130 of the second TSN system 310. However, in FIG. 3, a TSN AF 328 does not directly receive data through a second TSN system 310.

Each of a DS-TT/UE 321 and an NW-TT/UPF 326 operate as a port of a 5GS logical bridge and serve to exchange a stream reservation protocol (SRP) with external TSN nodes and to process the SRP when necessary. When the DS-TT/UE 321 and the NW-TT/UPF 326 process only part of the foregoing operation, SRP-related information may be transmitted through a user plane path. In addition, the DS-TT/UE 321 and the NW-TT/UPF 326 may exchange management information with the TSN AF 328 using a PDU session establishment/modification process or the like. According to the embodiment of FIG. 3, the TSN AF 328 does not need a function of interworking with a CNC. However, the TSN AF 328 may still serve to aggregate internal information of the 5GS logical bridge. To this end, the TSN AF 328 may perform only the existing PDU session establishment/modification process or may even partially hand over this function to the NW-TT.

A first method (method 1) according to the disclosure may operate based on the DS-TT/UE 321, the NW-TT/UPF 326, and the TSN AF 328. Not only the NW-TT/UPF 326, but also the DS-TT/UE 321, has the capability to process an SRP, and the TSN AF 328 can aggregate internal information of the 5GS bridge. In this case, the TSN AF 328 can aggregate a plurality of PDU sessions. That is, since the TSN AF 328 can aggregate information, a plurality of DS-TT/UEs 321 may be connected to the same NW-TT/UPF 326. Further, the DS-TT/UE 321 may be a talker or a listener.

A second method (method 2) according to the disclosure may operate based on the NW-TT/UPF 326 and the TSN AF 328. The NW-TT/UPF 326 can process an SRP instead of the DS-TT/UE 321, and the TSN AF 328 can aggregate internal information of the 5GS bridge. The DS-TT/UE 321 does not need to directly process an SRP and may thus have a light configuration. Further, since the TSN AF 328 can aggregate information, a plurality of DS-TT/UEs 321 may be connected to the same NW-TT/UPF 326.

A third method (method 3) according to the disclosure may operate based on the NW-TT/UPF. The NW-TT/UPF 326 processes an SRP instead of the DS-TT/UE 321 and has a function of aggregating information. The DS-TT/UE 321 does not need to directly process an SRP and may thus have a light configuration. To support a case where a plurality of DS-TT/UEs 321 is connected to the same NW-TT/UPF 326, the same SMF 324 needs to be able to process a plurality of PDU sessions based on information stored in the UPF instead of the TSN AF 328.

In the following description, even though the methods disclosed herein are different, when the same process, for example, a process in which a UE transmits a frame to a UPF or a process in which the UPF transmits the same message to a specific node of a core network of a mobile communication system, for example, a 5G system, is performed, it may be understood that the same operation is performed even though stated in different embodiments unless specifically defined in each embodiment as being used only for the embodiment.

Figure 4A:
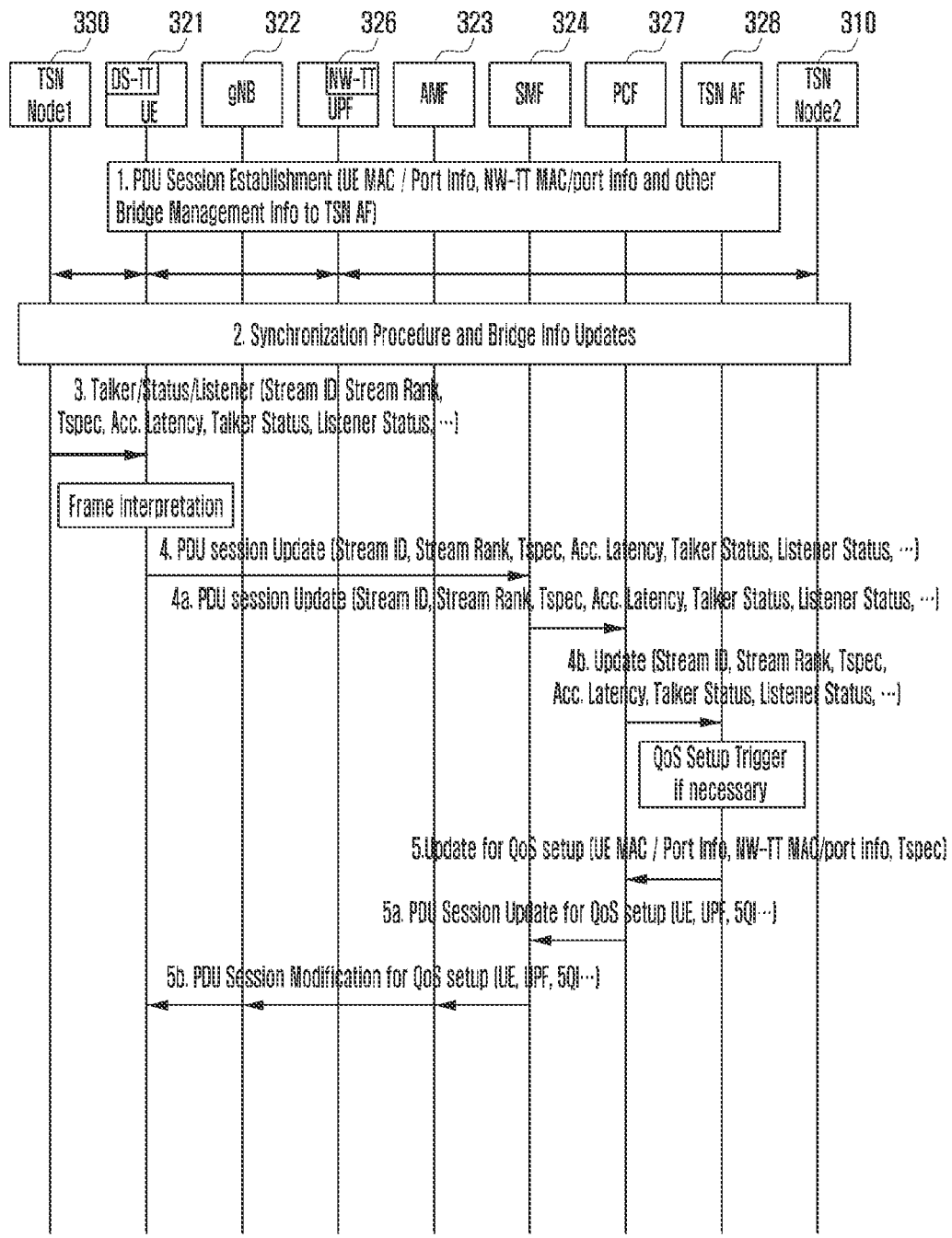
FIG. 4A illustrates signal flow between a mobile communication network and TSN networks in an uplink operation of a first method, according to the disclosure.
Figure 4B:
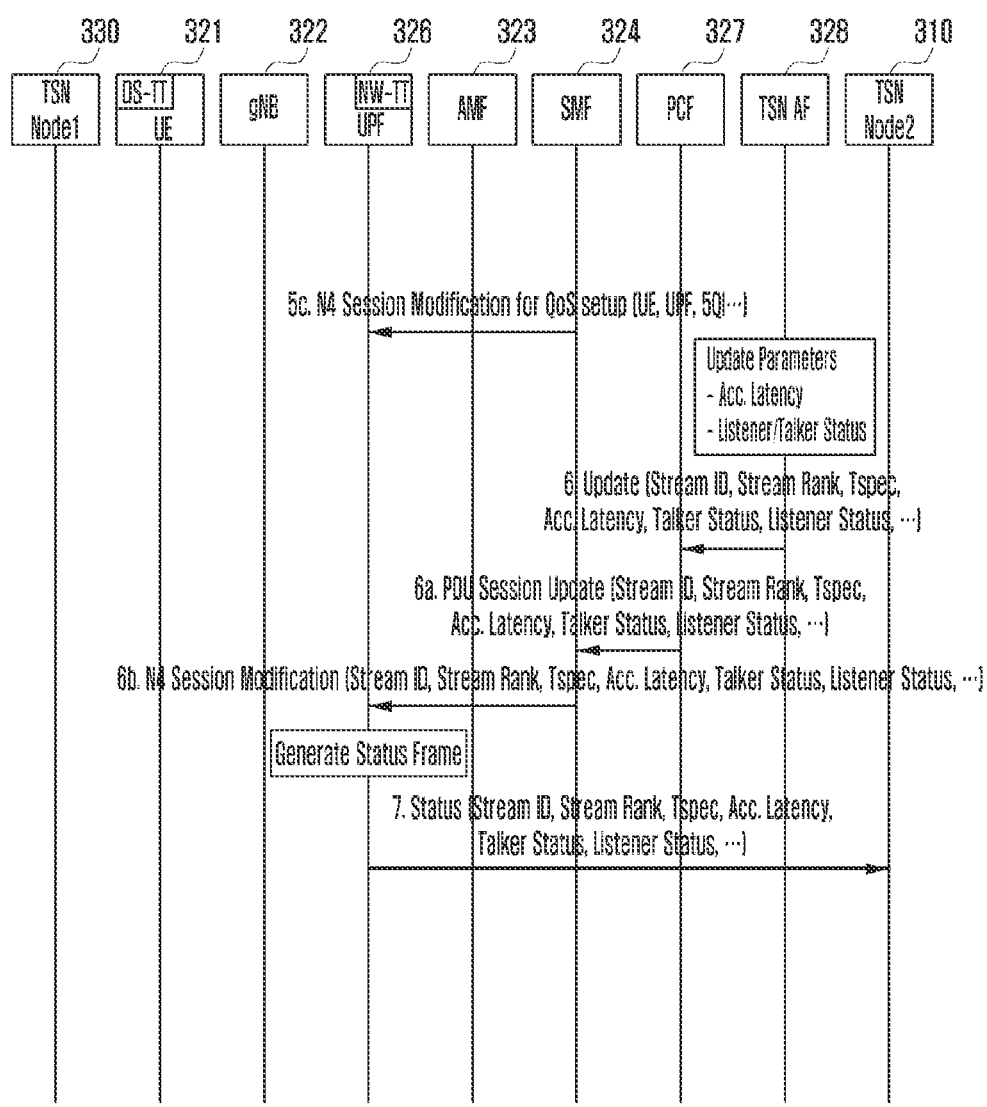
FIG. 4B illustrates signal flow between a mobile communication network and TSN networks in an uplink operation of the first method; according to the disclosure.

FIG. 4A illustrates signal flow between a mobile communication network and TSN networks in an uplink operation of method 1 according to the disclosure, and FIG. 4B illustrates signal flow between a mobile communication network and TSN networks in an uplink operation of method 1 according to the disclosure. In the following description, it is assumed that a DS-TT/UE and a UE include a DS-TT as described above. Accordingly, all of a user device, a UE, a terminal, and a DS-TT/UE may be electronic devices including a DS-TT described above. These terms may be interchangeably used unless specified otherwise in the following description. Further, it is assumed that a UPF includes an NW-TT. In the foregoing description with reference to FIG. 3A and FIG. 3B, an RAN is illustrated as a base station in a mobile communication network. In the following description, since a base station in a 5G network is described, a gNB is illustrated, and like reference numerals are used.

In operation 1, a PDU session may be established between the DS-TT/UE 321 and the NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

In operation 3, the DS-TT/UE 321 may receive a talker/status/listener frame from the first TSN node 330 and may interpret the same. In this embodiment, the DS-TT/UE 321 interprets an Ethernet frame received from the first TSN node 330.

In operations 4/4a/4b, the DS-TT/UE 321 may transmit information, such as a stream ID, a stream rank, Tspec, accumulated latency, a talker status, and a listener status, to the TSN AF 328 through a PDU session update procedure. In operation 4, the DS-TT/UE 321 may transmit the information, such as the stream ID, the stream rank, Tspec, the accumulated latency, the talker status, and the listener status, to an SMF 324 through the PDU session update procedure. In operation 4a, the SMF 324 may transmit the information received in operation 4 to a PCF 327. For data transmitted to the PCF 327, the PDU session update procedure may also be used. Subsequently, the PCF 327 may provide the information received in operation 4b to the TSN AF 328.

Upon receiving the information, the TSN AF 328 may perform a QoS setup trigger if necessary. The QoS setup trigger is for a mobile communication network to adjust the configuration of the mobile communication network in accordance with a QoS requested via the frame received from the first TNS node 330 in order to operate as one node of TSN.

In operation 5, the TSN AF 328 may provide update information for QoS setup to the PCF 327. Upon receiving this information, the PCF 327 may transmit a PDU session update message for QoS setup to the SMF 324 in operation 5a. Accordingly, the SMF 324 may provide the received information to the AMF 323, the gNB 322, and the UE 321 in operation 5b. In operation 5c, the SMF 324 may provide QoS setup information to the UPF 326 using an N4 session modification.

Subsequently, the TSN AF 328 may update parameters. Here, updating the parameters may be an operation of updating the parameters for the mobile communication network to transmit the Ethernet frame to the next node so as to operate as one TSN node. For example, in a case illustrated in FIG. 2D, a 5GS logical bridge also needs to allocate a resource for supporting a stream. The TSN AF 328 may update the parameters, such as the talker status, the listener status, and the accumulated latency, as described in FIG. 2B and FIG. 2D, and may then transmit the parameters to the NW-TT/UPF 326 in operations 6/6a/6b of FIG. 4B. Operations 6/6a/6b include paths necessary for transmission from the TSN AF 328 to the NW-TT/UPF 326, for example, transmission to the NW-TT/UPF 326 (operation 6b) via the PCF 327 (operation 6) and via the SMF 324 (operation 6a).

Through the above operations, the NW-TT/UPF 326 may generate a status frame reflecting the received information and may transmit the status frame to an external TSN node, for example, the second TSN node 310, in operation 7.

Figure 5A:
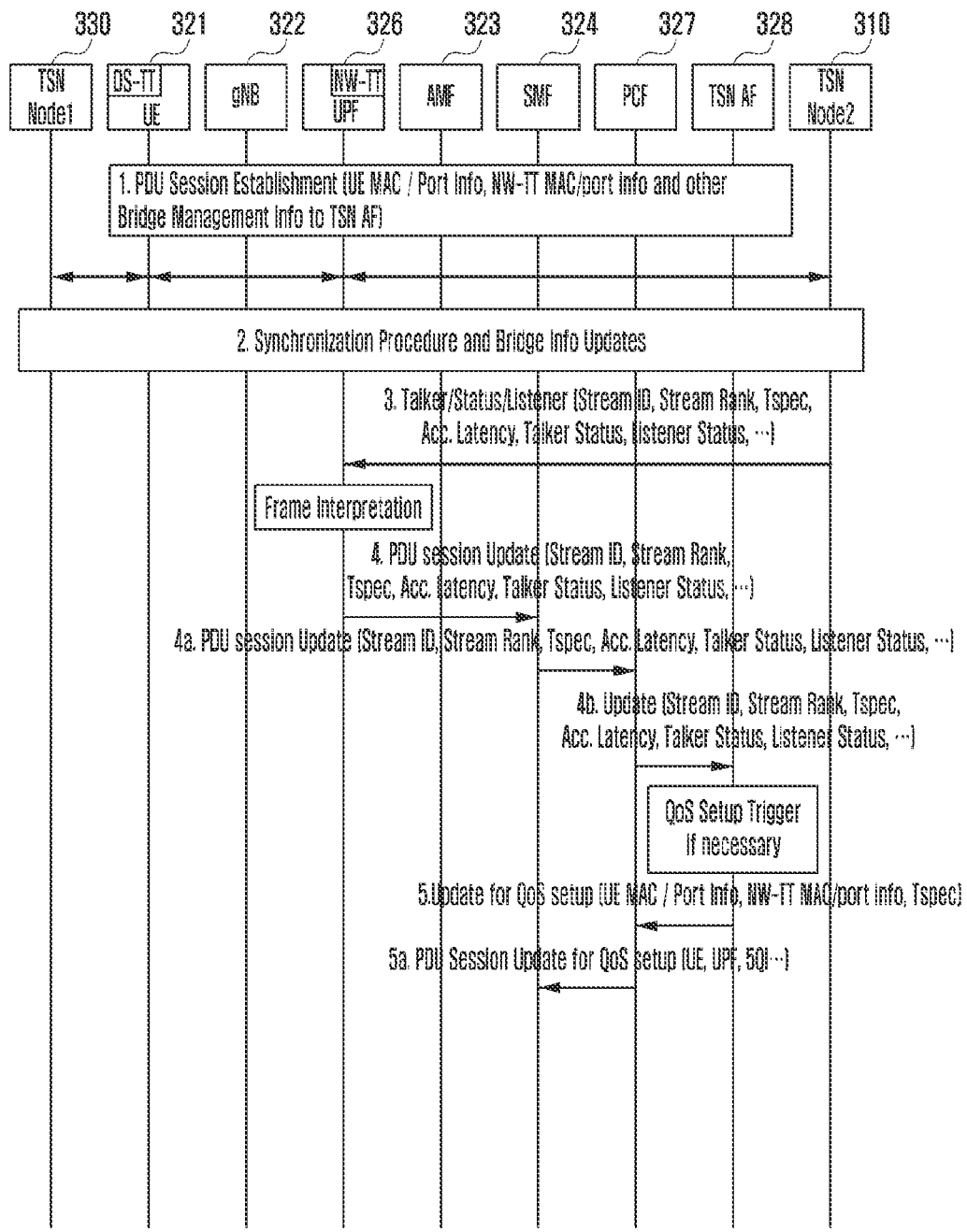
FIG. 5A illustrates signal flow in a mobile communication network in a downlink operation of the first method; according to the disclosure.
Figure 5B:
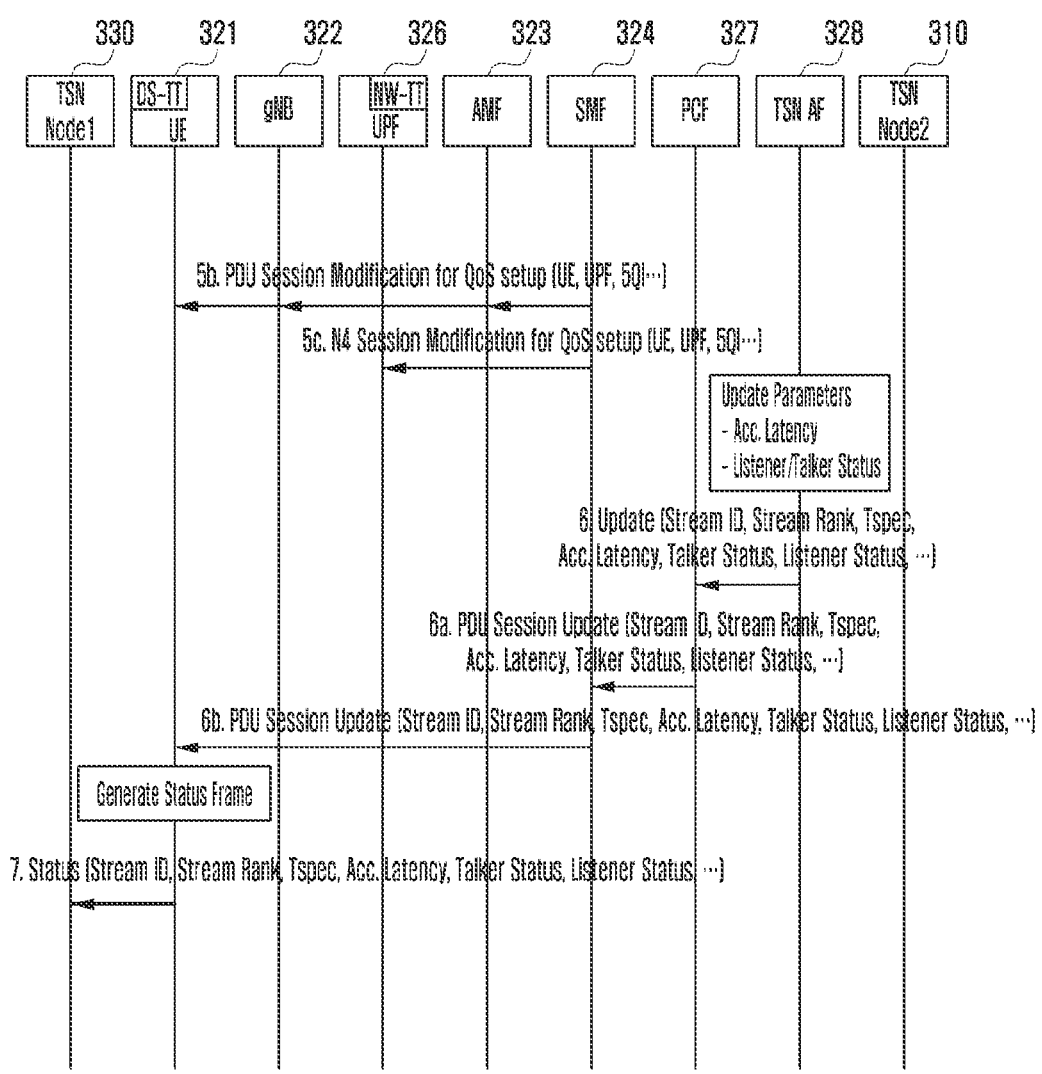
FIG. 5B illustrates signal flow in a mobile communication network in a downlink operation of the first method; according to the disclosure.

FIG. 5A illustrates signal flow in a mobile communication network in a downlink operation of method 1 according to the disclosure, and FIG. 5B illustrates signal flow in a mobile communication network in a downlink operation of method 1 according to the disclosure. The foregoing description of the UE in FIG. 4A and FIG. 4B may be equally applied to FIG. 5A and FIG. 5B. Further, as described above, it is assumed that a UPF includes an NW-TT. In the foregoing description with reference to FIG. 3A and FIG. 3B, an RAN is illustrated as a base station on a mobile communication network. In the following description, since a base station in a 5G network is described, a gNB is illustrated, and like reference numerals are used.

In operation 1, a PDU session may be established between a DS-TT/UE 321 and an NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

In operation 3, the NW-TT/UPF 326 may receive a talker/status/listener frame from the second TSN node 310 and may interpret the same. In this embodiment, the NW-TT/UPF 326 may interpret a frame received from the second TSN node 310.

In operations 4/4a/4b, the NW-TT/UPF 326 may transmit information, such as a stream ID, a stream rank, Tspec, accumulated latency, a talker status, and a listener status, to the TSN AF 328 through a PDU session update procedure. In operation 4, the UPF 326 may transmit the information, such as the stream ID, the stream rank, Tspec, the accumulated latency, the talker status, and the listener status, to an SMF 324 through an N4 session update procedure. In operation 4a, the SMF 324 may transmit the information received in operation 4 to a PCF 327. For data transmitted to the PCF 327, the PDU session update procedure may also be used. Subsequently, the PCF 327 may provide the information received in operation 4b to the TSN AF 328.

Upon receiving the information, the TSN AF 328 may perform a QoS setup trigger if necessary. The QoS setup trigger has been described above and will be further described in another embodiment to be illustrated below. In operation 5, the TSN AF 328 may provide update information for QoS setup to the PCF 327. Upon receiving this information, the PCF 327 may transmit a PDU session update message for QoS setup to the SMF 324 in operation 5a. Accordingly, the SMF 324 may provide the received information to the AMF 323, the gNB 322, and the UE 321 in operation 5b. In operation 5c, the SMF 324 may provide QoS setup information to the UPF 326 using an N4 session modification.

Subsequently, the TSN AF 328 may update parameters. Here, updating the parameters may be an operation of updating the parameters for the mobile communication network to transmit the Ethernet frame to the next node so as to operate as one TSN node. For example, in a case illustrated in FIG. 2D, a 5GS logical bridge also needs to allocate a resource for supporting a stream. The TSN AF 328 may update parameters, such as the talker status, the listener status, and the accumulated latency, as described in FIG. 2B and FIG. 2D, and may then transmit the parameters to the DS-TT/UE 321 in operations 6/6a/6b in FIG. 5B. Operations 6/6a/6b include paths necessary for transmission from the TSN AF 328 to the DS-TT/UE 321, for example, transmission to the DS-TT/UE 321 (operation 6b) via the PCF 327 (operation 6) and via the SMF 324 (operation 6a).

Through the above operations, the DS-TT/UE 321 may generate a status frame reflecting the received information and may transmit the status frame to an external TSN node, for example, the first TSN node 330, in operation 7.

Figure 6A:
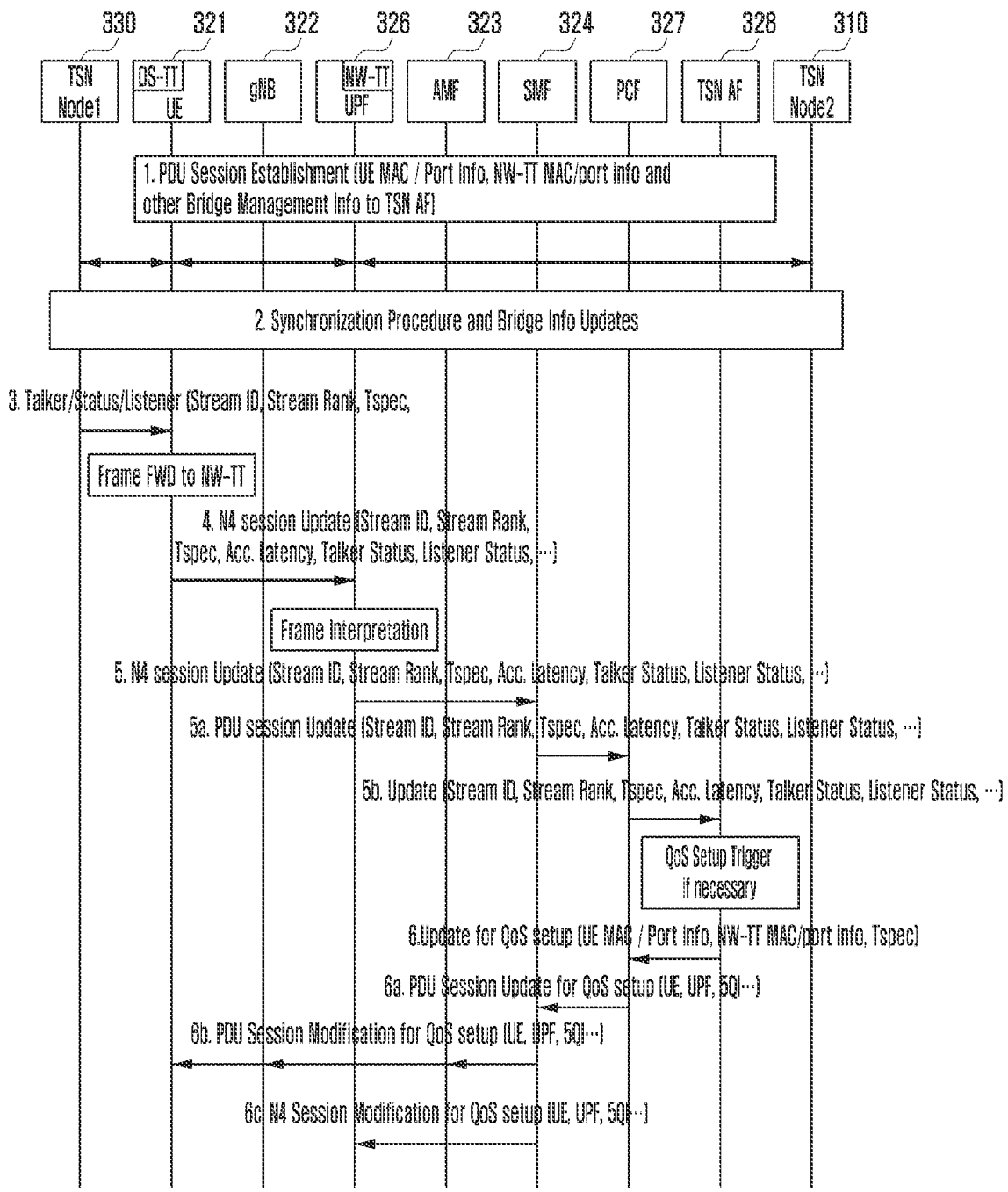
FIG. 6A illustrates signal flow in a mobile communication network in an uplink operation of a second method; according to the disclosure.
Figure 6B:
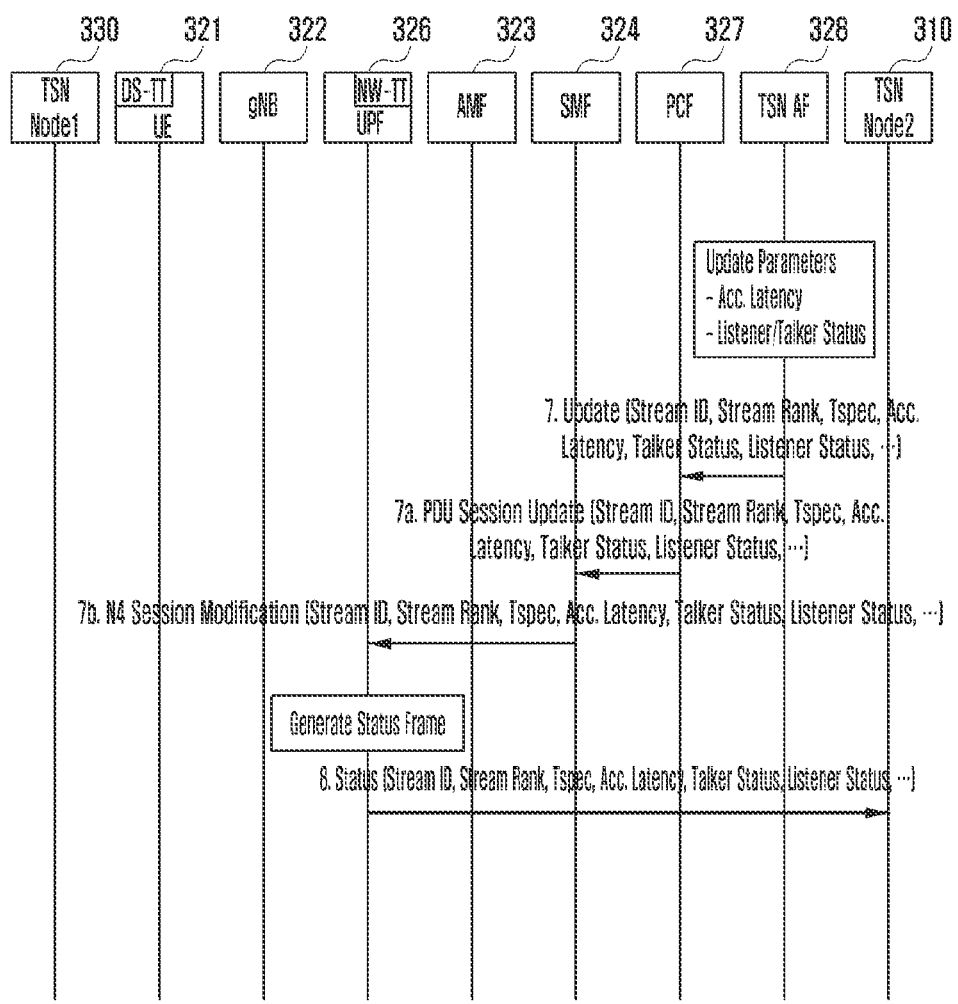
FIG. 6B illustrates signal flow in a mobile communication network in an uplink operation of the second method, according to the disclosure.

FIG. 6A illustrates signal flow in a mobile communication network in an uplink operation of method 2 according to the disclosure, and FIG. 6B illustrates signal flow in a mobile communication network in an uplink operation of method 2 according to the disclosure. In the following description, it is assumed that a DS-TT/UE and a UE include a DS-TT as described above. Accordingly, all of a user device, a UE, a terminal, and a DS-TT/UE may be electronic devices including a DS-TT described above. These terms may be interchangeably used unless specified otherwise in the following description. Further, it is assumed that a UPF includes an NW-TT. In the foregoing description with reference to FIG. 3A and FIG. 3B, an RAN is illustrated as a base station on a mobile communication network. In the following description, since a base station in a 5G network is described, a gNB is illustrated, and like reference numerals are used.

In operation 1, a PDU session may be established between the DS-TT/UE 321 and the NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

In operation 3, the DS-TT/UE 321 may receive a talker/status/listener frame from the first TSN node 330. The frame received by the DS-TT/UE 321 from the first TSN node 330 in operation 3 may be an Ethernet frame. The Ethernet frame received from the first TSN node 330 may be received by the DS-TT included in the UE. The DS-TT/UE 321 may transmit the frame to the NW-TT/UPF 326 through a base station 322 of the communication system, for example, the 5G network, without separately interpreting the frame in operation 4. The DS-TT/UE 321 may transmit the Ethernet frame to the NW-TT/UPF 326 through the PDU session established in operation 1.

The NW-TT/UPF 326 may interpret the received frame. The NW-TT/UPF 326 may identify data and control information related to the data and/or control information necessary for control to transmit the Ethernet frame in the received Ethernet frame and may extract the control information. In the following description, control information related to data or information necessary for control to transmit an Ethernet frame are collectively referred to as control information. In the disclosure, information including a stream ID, a stream rank, Tspec, accumulated latency, a talker status, and a listener status as described in FIG. 2A to FIG. 2D or at least one of these pieces of information is assumed as control information.

The NW-TT/UPF 326 may convert the control information into a message for transmission in the mobile communication network based on the interpretation result. For example, the NW-TT/UPF 326 may use an N4 session update message in order to transmit the control information to the TSN AF 328. In operation 5, the NW-TT/UPF 326 may transmit the control information to an SMF 324 using the N4 session update message. The SMF 324 may transmit a PDU session update message to a PCF 327 in response to the N4 session update message received in operation 5. As described above, the PDU session update message may include all of the control information or at least one piece of the control information.

Upon receiving the PDU session update message, the PCF 327 may generate an update message using all or at least one piece of the control information included in the PDU session update message and may transmit the update message to the TSN AF 328 in operation 5b.

That is, in operations 5/5a/5b described above, all or at least one piece of the control information, such as the stream ID, the stream rank, Tspec, the accumulated latency, the talker status, and the listener status, may be transmitted to the TSN AF 328 through a PDU session update procedure. As described in the disclosure, upon receiving the Ethernet frame, the NW-TT/UPF 326 may transmit the control information of the Ethernet frame to the TSN AF 328 via the SMF 324 and the PCF 327 using the messages defined in the mobile communication network in operations 5/5a/5b. That is, this data may be transmitted using the N4 session update message in operation 5 and may be transmitted using the PDU session update message in operation 5a.

Upon receiving the control information, the TSN AF 328 may perform a QoS setup trigger if necessary. The QoS setup trigger may be an operation of allocating a resource in advance in the mobile communication network based on a QoS required by the Ethernet frame. When only a resource configured (allocated) in operation 1 is sufficient, the QoS setup trigger may not be needed. However, when the resource allocated in operation 1 does not satisfy the QoS required by the Ethernet frame, a new QoS setup trigger needs to be performed.

In operation 6, the TSN AF 328 may provide update information for QoS setup to the PCF 327 via an update message for QoS setup. This operation may be a procedure for satisfying a requirement in accordance with the QoS required by the Ethernet frame so that the mobile communication system, for example, the 5G communication system, operates as a specific node of a TSN system. In operation 6, the TSN AF 328 may provide the update information for QoS setup to the PCF 327 even when a preset resource is sufficient. The update message for QoS setup transmitted in operation 6 may include information, such as UE MAC/port information, NW-TT MAC/port information, and Tspec.

Upon receiving the update message for QoS setup, the PCF 327 may transmit a PDU session update message for QoS setup to the SMF 324 in operation 6a. The PDU session update message for QoS setup may include information of the UE, the UPF, and a 5G QoS indicator (5QI). Through this message, the PCF 327 may provide, to the SMF 324, policy information corresponding to the QoS required by the Ethernet frame in the 5G mobile communication network with respect to the UE and the UPF. In operation 6b, the SMF 324 may provide a PDU session modification message for QoS setup to an AMF 323, the gNB 322, and the UE 321 based on the information included in the received PDU session update message for QoS. This message may include pieces of information for QoS setup required by the Ethernet frame from each node. For example, the message may include all or at least one of the information of the UE, the UPF, the 5QI included in the PDU session update message for QoS setup. In operation 6c, the SMF 324 may provide QoS setup information for transmitting/receiving the Ethernet frame to the UPF 326 using an N4 session modification message for QoS setup.

Through operation 3 to operations 6/6a/6b described above, a setup for the mobile communication system to operate as one TSN node to transmit the Ethernet frame may be established.

Subsequently, the TSN AF 328 may update parameters for providing a setup result to the second TSN node 310 based on the setup. That is, the TSN AF 328 may update the parameters for the mobile communication system to transmit the Ethernet frame to the next node so as to operate as one TSN node. The parameters may include, for example, success/failure information indicating whether the mobile communication system can operate as one TSN node to transmit the Ethernet frame may be included. For example, when the mobile communication system operates as BR2 122 illustrated in FIG. 2D, a 5GS logical bridge also needs to allocate a resource for supporting a stream. The TSN AF 328 needs to perform control to provide information about the allocated resource to the next TSN node. The TSN AF 328 may update parameters, such as the talker status, the listener status, and the accumulated latency, as described in FIG. 2B and FIG. 2D, and may then transmit the parameters to the NW-TT/UPF 326 in operations 7/7a/7b in FIG. 6B. Operations 7/7a/7b include paths necessary for transmission from the TSN AF 328 to the NW-TT/UPF 326, for example, transmission to the NW-TT/UPF 326 (operation 7b) via the PCF 327 (operation 7) and via the SMF 324 (operation 7a).

Specifically, in operation 7, the TSN AF 328 may generate an update message including control information needed for the second TSN node, such as the stream ID, the stream rank, Tspec, the accumulated latency, the talker status, and the listener status, to provide the updated information to the second TSN node 310 and may provide the update message to the PCF 327. Upon receiving the update message, the PCF 327 may include the control information in a PDU session update message and may provide the PDU session update message to the SMF 324 in operation 7a. Upon receiving the PDU session update message, the SMF 324 may transmit an N4 session modification message including the control information to the NW-TT/UPF 326 in operation 7b.

Upon receiving the N4 session modification message, the NW-TT/UPF 326 may include the control information configured and transmitted by the TSN AF 328 in the data of the frame received in operation 4, thereby generating a status frame. The status frame generated by the NW-TT/UPF 326 may include only the Ethernet control information or may further include the success/failure information indicating whether the mobile communication system can operate as one TSN node to transmit the Ethernet frame.

Through the foregoing operations, the NW-TT/UPF 326 may generate the status frame reflecting the received information and may transmit the status frame to an external TSN node, for example, the second TSN node 310, in operation 7.

Figure 7A:
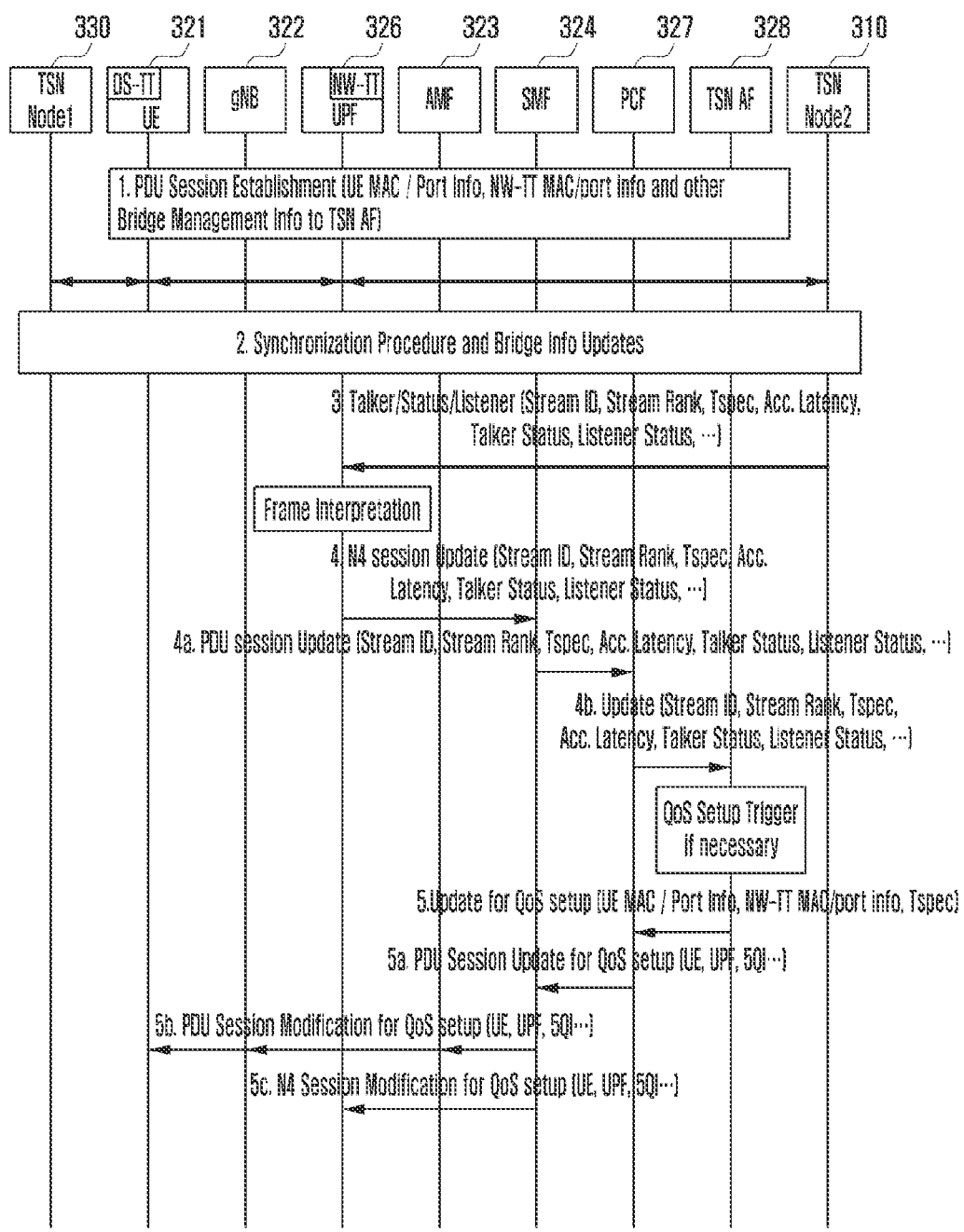
FIG. 7A illustrates signal flow in a mobile communication network in a downlink operation of the second method, according to the disclosure.
Figure 7B:
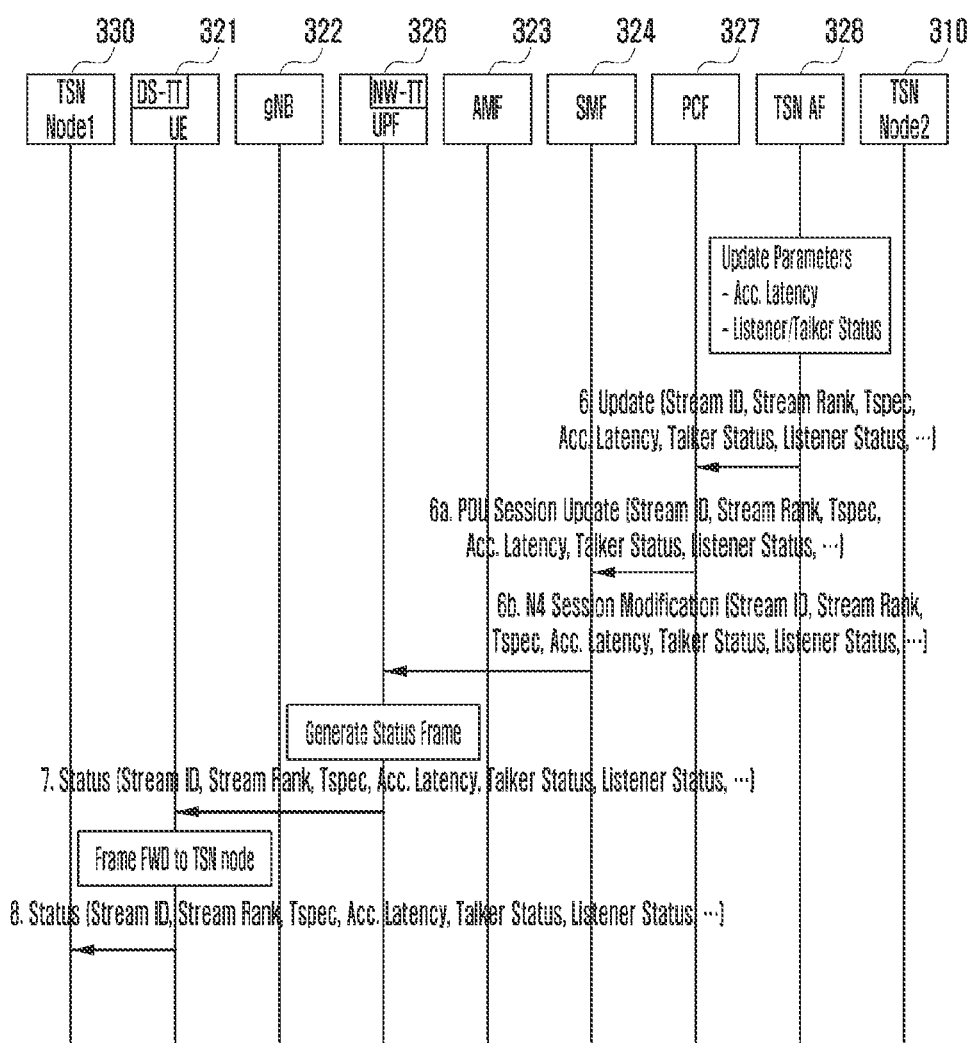
FIG. 7B illustrates signal flow in a mobile communication network in a downlink operation of the second method, according to the disclosure.

FIG. 7A illustrates signal flow in a mobile communication network in a downlink operation of method 2 according to the disclosure, and FIG. 7B illustrates signal flow in a mobile communication network in a downlink operation of method 2 according to the disclosure. The foregoing description of the UE in FIG. 7A and FIG. 7B may be equally applied to FIG. 4A and FIG. 4B. Further, as described above, it is assumed that a UPF includes an NW-TT. In the foregoing description with reference to FIG. 3A and FIG. 3B, an RAN is illustrated as a base station on a mobile communication network. In the following description, since a base station in a 5G network is described, a gNB is illustrated, and like reference numerals are used.

In operation 1, a PDU session may be established between the DS-TT/UE 321 and the NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

In operation 3, the NW-TT/UPF 326 may receive a talker/status/listener frame from the second TSN node 310 and may interpret the same. The frame received by the NW-TT/UPF 326 from the second TSN node 310 in operation 3 may be an Ethernet frame. The Ethernet frame transmitted by the second TSN node 310 may be received by the NW-TT in the UPF. The Ethernet frame may include data and control information. The control information may include, for example, a stream ID, a stream rank, Tspec, accumulated latency, a talker status, and a listener status. When interpreting the frame received from the second TSN node 310, which is the Ethernet frame, the NW-TT/UPF 326 may identify the data and the control information and may extract the control frame from the Ethernet frame.

In operations 4/4a/4b, the NW-TT/UPF 326 may transmit the information, such as the stream ID, the stream rank, Tspec, the accumulated latency, the talker status, and the listener status, to the TSN AF 328 through a PDU session update procedure defined in a 5G mobile communication network. Specifically, in operation 4, the NW-TT/UPF 326 may include at least one of the control information, such as the stream ID, the stream rank, Tspec, the accumulated latency, the talker status, and the listener status, obtained from the Ethernet frame received from the second TSN node 310 in an N4 session update message and may transmit the N4 session update message to an SMF 324. The SMF 324 may obtain the control information from the N4 session update message received in operation 4 to a PCF 327 and may transmit a PDU session update message including the control information to a PCF 327 in operation 4a. For data transmitted to the PCF 327, the PDU session update procedure may also be used. Subsequently, the PCF 327 may include the control information included in the received PDU session update message in an update message and may provide the update message to the TSN AF 328 in operation 4b.

Upon receiving the control information through the above operations, the TSN AF 328 may perform a QoS setup trigger if necessary. The QoS setup trigger may be an operation of allocating a resource in advance in the mobile communication network based on a QoS required by the Ethernet frame. When only a resource configured (allocated) in operation 1 is sufficient, the QoS setup trigger may not be needed. However, when the resource allocated in operation 1 does not satisfy the QoS required by the Ethernet frame, a new QoS setup trigger needs to be performed.

In operation 5, the TSN AF 328 may transmit an update message for QoS setup to the PCF 327. This operation may be a procedure for satisfying a requirement in accordance with the QoS required by the Ethernet frame so that the mobile communication system, for example, the 5G communication system, operates as a specific node of a TSN system. In operation 5, the TSN AF 328 may provide the update information for QoS setup to the PCF 327 even when a preset resource is sufficient. The update message for QoS setup transmitted in operation 5 may include information, such as UE MAC/port information, NW-TT MAC/port information, and Tspec.

Upon receiving the update message for QoS setup, the PCF 327 may transmit a PDU session update message for QoS setup to the SMF 324 in operation 5a. The PDU session update message for QoS setup may include control information of the UE, the UPF, and a 501. In operation 5a, the PCF 327 may transmit the PDU session update message for QoS setup to the SMF 324, thereby providing policy information for transmitting/receiving the Ethernet frame. In operation 5b, the SMF 324 may include the policy information and the control information included in the received message in a PDU session modification message for QoS setup and may provide the PDU session modification message for QoS setup to an AMF 323, the gNB 322, and the UE 321. This message may include pieces of information for QoS setup required by the Ethernet frame from each node. In operation 5c, the SMF 324 may provide QoS setup information for transmitting/receiving the Ethernet frame to the UPF 326 using an N4 session modification message for QoS setup.

Through operation 3 to operations 5/5a/5b/5c described above, the QoS setup for the mobile communication system to operate as one TSN node may be established.

Subsequently, the TSN AF 328 may update parameters for the mobile communication system to transmit the Ethernet frame to the next node so as to operate as one TSN node. For example, the parameters updated by the TSN AF 328 may include success/failure information indicating whether the mobile communication system can operate as one TSN node to transmit the Ethernet frame. This operation is described with reference to FIG. 2A to FIG. 2D described above. For example, when the TSN AF 328 operates as in FIG. 2D, a 5GS logical bridge also needs to allocate a resource for supporting a stream. The TSN AF 328 needs to perform control to provide information about the allocated resource to the next TSN node. The TSN AF 328 may update parameters, such as the talker status, the listener status, and the accumulated latency, as described in FIG. 2B and FIG. 2D, and may then transmit the parameters to the NW-TT/UPF 326 in operations 6/6a/6b in FIG. 7B. Operations 6/6a/6b include paths necessary for transmission from the TSN AF 328 to the NW-TT/UPF 326, for example, transmission to the NW-TT/UPF 326 (operation 6b) via the PCF 327 (operation 6) and via the SMF 324 (operation 6a).

Specifically, in operation 6, the TSN AF 328 may generate an update message including control information needed for the first TSN node 330, such as the stream ID, the stream rank, Tspec, the accumulated latency, the talker status, and the listener status, to provide the updated information to the first TSN node 330 and may provide the update message to the PCF 327. Upon receiving the update message, the PCF 327 may include the control information in a PDU session update message and may provide the PDU session update message to the SMF 324 in operation 6a. Upon receiving the PDU session update message, the SMF 324 may transmit an N4 session modification message including the control information to the NW-TT/UPF 326 in operation 6b.

Upon receiving the N4 session modification message, the NW-TT/UPF 326 may include the control information configured and transmitted by the TSN AF 328 in the data of the frame received in operation 3, thereby generating a status frame. The status frame generated by the NW-TT/UPF 326 may include only the Ethernet control information or may further include the success/failure information indicating whether the mobile communication system can operate as one TSN node to transmit the Ethernet frame.

Through the foregoing operations, the NW-TT/UPF 326 may generate the status frame reflecting the received information and may transmit the status frame to the DS-TT/UE 321 in operation 7.

The DS-TT/UE 321 may transmit the received status frame to the external first TSN node 330 without separately interpreting the status frame in operation 8.

Figure 8A:
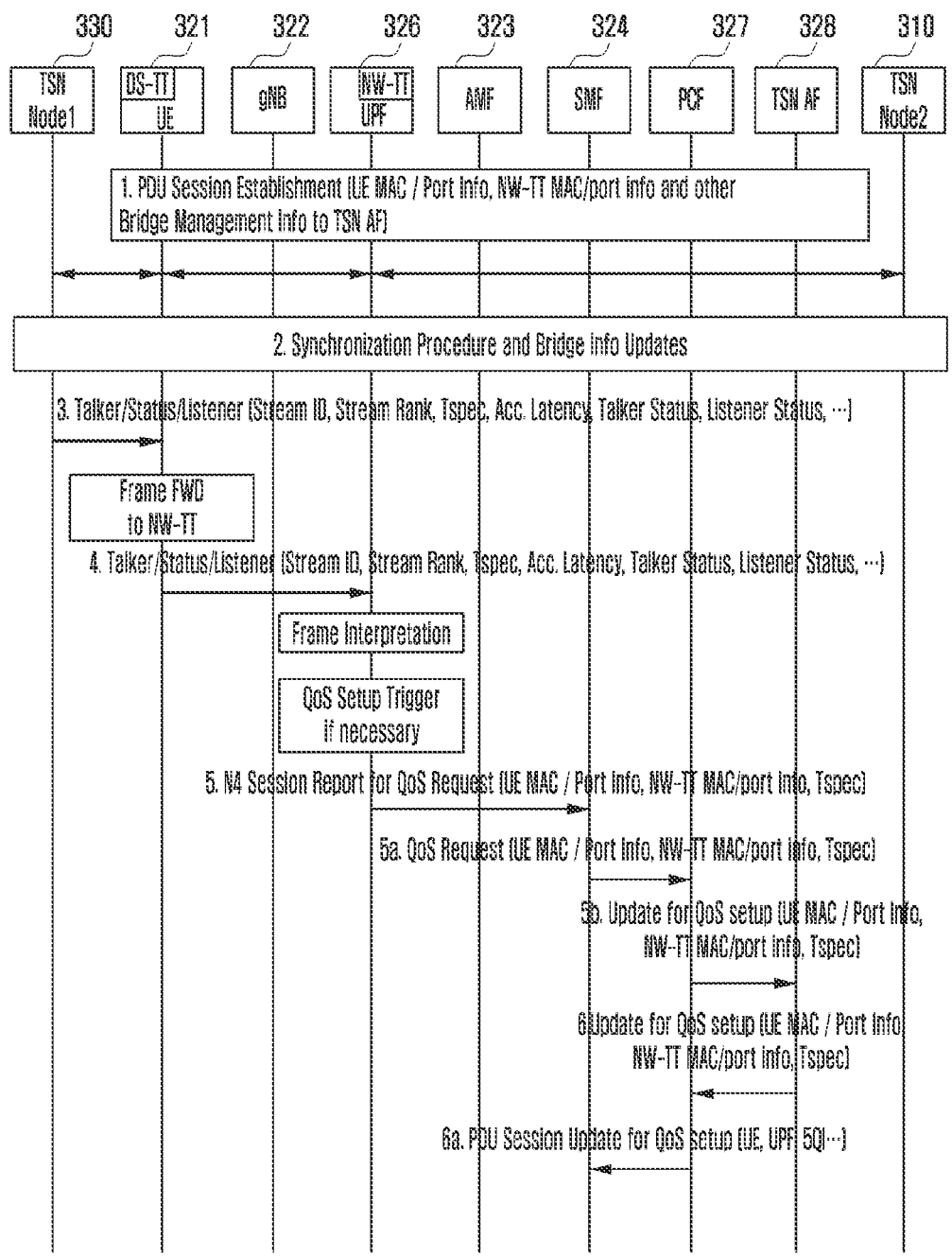
FIG. 8A illustrates signal flow in a mobile communication network in an uplink operation of a third method, according to the disclosure.
Figure 8B:
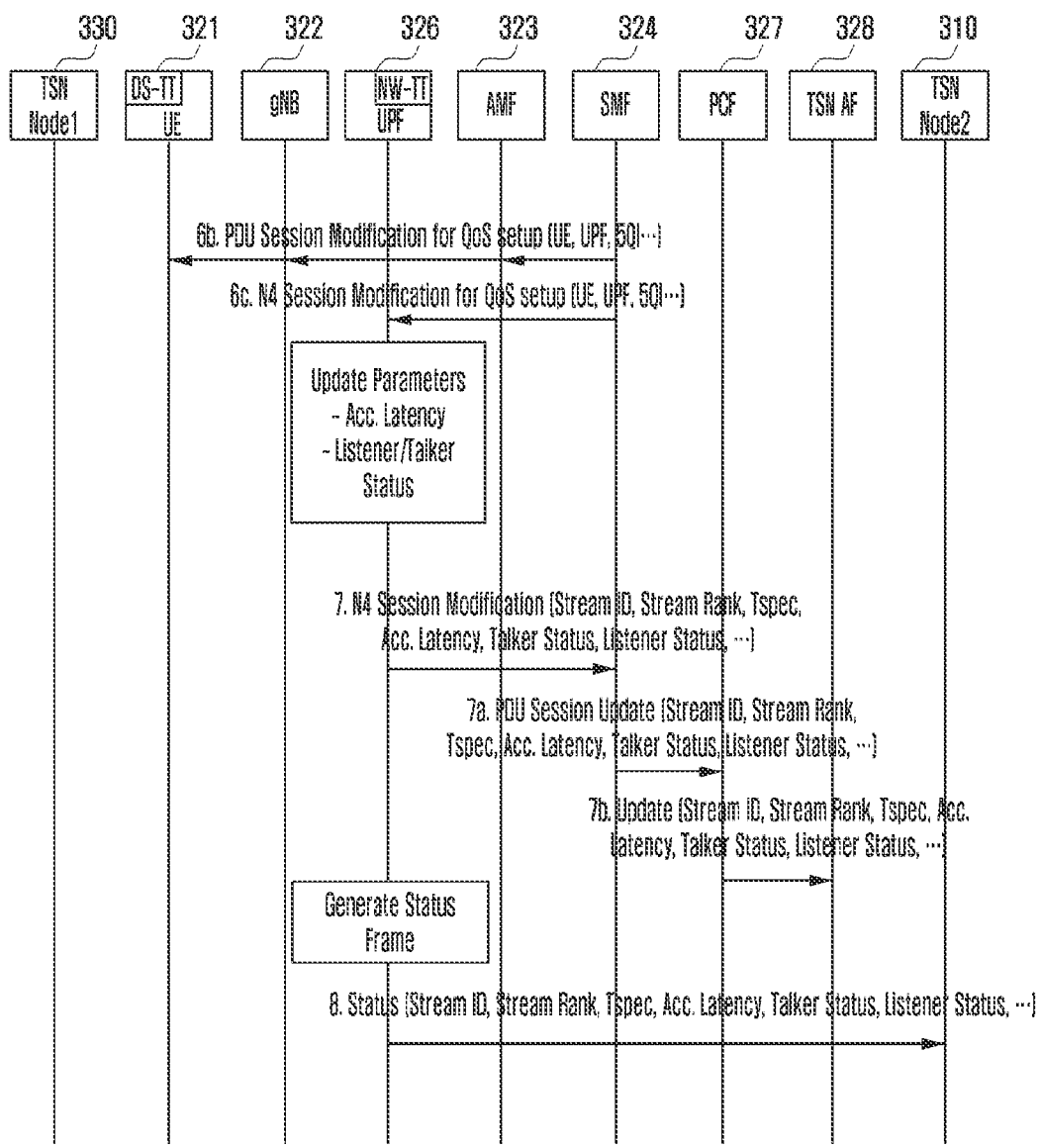
FIG. 8B illustrates signal flow in a mobile communication network in an uplink operation of the third method, according to the disclosure.

FIG. 8A illustrates signal flow in a mobile communication network in an uplink operation of method 3 according to the disclosure, and FIG. 8B illustrates signal flow in a mobile communication network in an uplink operation of method 3 according to the disclosure. In the following description, it is assumed that a DS-TT/UE and a UE include a DS-TT as described above. Accordingly, all of a user device, a UE, a terminal, and a DS-TT/UE may be electronic devices including a DS-TT described above. These terms may be interchangeably used unless specified otherwise in the following description. Further, it is assumed that a UPF includes an NW-TT. In the foregoing description with reference to FIG. 3A and FIG. 3B, an RAN is illustrated as a base station in a mobile communication network. In the following description, since a base station in a 5G network is described, a gNB is illustrated, and like reference numerals are used.

In operation 1, a PDU session may be established between the DS-TT/UE 321 and the NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

The DS-TT/UE 321 may receive a talker/status/listener frame from the first TSN node 330 in operation 3 and may transmit the talker/status/listener frame to the NW-TT/UPF 326 without separately interpreting the frame in operation 4.

The NW-TT/UPF 326 may interpret the received frame and may then transmit an update request for QoS setup to the TSN AF 328 through a PDU session update procedure in operations 5/5a/5b if necessary. The interpretation operation may be the same as the operation described above in FIG. 6A, FIG. 6B, FIG. 7A, and FIG. 7B. Further, as described above, operations 5/5a/5b may be operations on a path for transmission via an SMF 324 and a PCF 327. The above data may be transmitted using an N4 session update in operation 5, may be transmitted using a QoS request message in operation 5a, and may be transmitted using an update message for QoS setup in operation 5b. These operations may be the same as the foregoing operations. Through these operations, the TSN AF 328 may obtain control information required by the frame received from the first TSN node.

The TSN AF 328 may perform QoS setup through operations 6/6a/6b/6c. In operation 6, the TSN AF 328 may transmit an update message for QoS setup to the PCF 327. In operation 6a, upon receiving the update message, the PCF 327 may transmit a PDU session update message for QoS setup to the SMF 324. In operation 6b, the SMF 324 may transmit a PDU session modification message for QoS setup to an AMF 323, the gNB 322, and the UE 321. Further, the SMF 324 may provide QoS setup information to the UPF 326 using an N4 session modification in operation 6c. These operations are substantially the same as those described above, and thus a detailed description thereof is omitted.

The UPF 326 may update parameters. Here, for example, in a case illustrated in FIG. 2D, a 5GS logical bridge also needs to allocate a resource for supporting a stream. The NW-TT/UPF 326 may update the parameters, such as a talker status, a listener status, and accumulated latency, as described in FIG. 2B and FIG. 2D. A difference of this embodiment from those illustrated in FIG. 6A, FIG. 6B, FIG. 7A, and FIG. 7B is that parameter updating is performed by the UPF. That is, parameter updating is performed by the TSN AF 328 in the embodiments illustrated in FIG. 6A, FIG. 6B, FIG. 7A, and FIG. 7B, while parameter updating is performed by the NW-TT/UPF 326 in this embodiment.

In operations 7/7a/7b, the NW-TT/UPF 326 may transmit information, such as a stream ID, a stream rank, Tspec, accumulated latency, a talker status, and a listener status, to the TSN AF 328. Operations 7/7a/7b may include paths necessary for transmission from the NW-TT/UPF 326 to the TSN AF 328, for example, transmission to the TSN AF 328 (operation 7b) via the SMF 324 (operation 7) and via the PCF 327 (operation 7a). Operations 7/7a/7b are for storing the information for a case where a plurality of PDU sessions is involved and may thus be omitted when a single PDU session is involved.

Through the foregoing operations, the NW-TT/UPF 326 may generate a status frame reflecting the updated information and may transmit the status frame to an external TSN node, for example, the second TSN node 310, in operation 8. That is, the NW-TT/UPF 326 as one node of TSN may transmit the received frame to the next node.

Figure 9A:
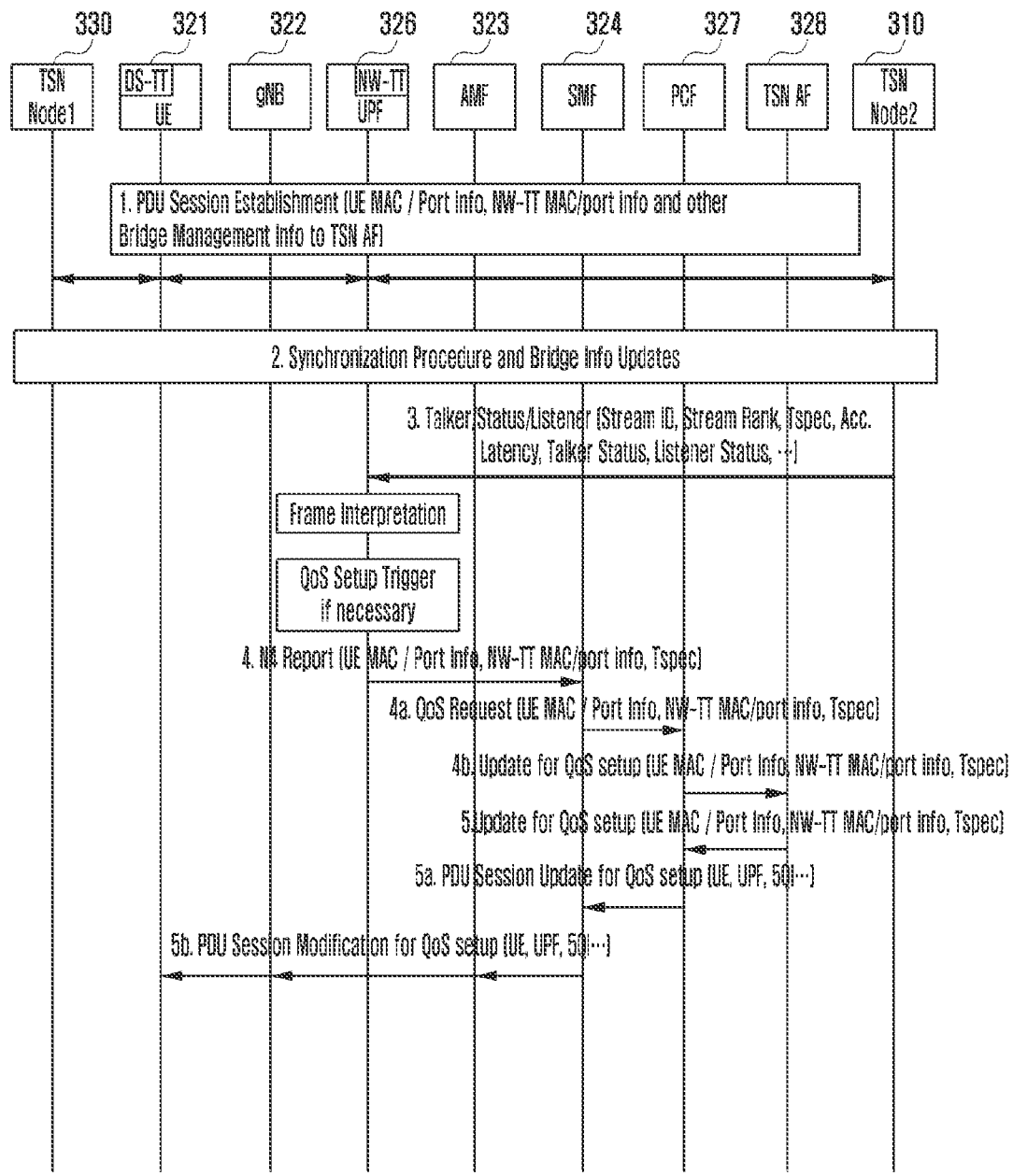
FIG. 9A illustrates signal flow in a mobile communication network in a downlink operation of the third method, according to the disclosure.
Figure 9B:
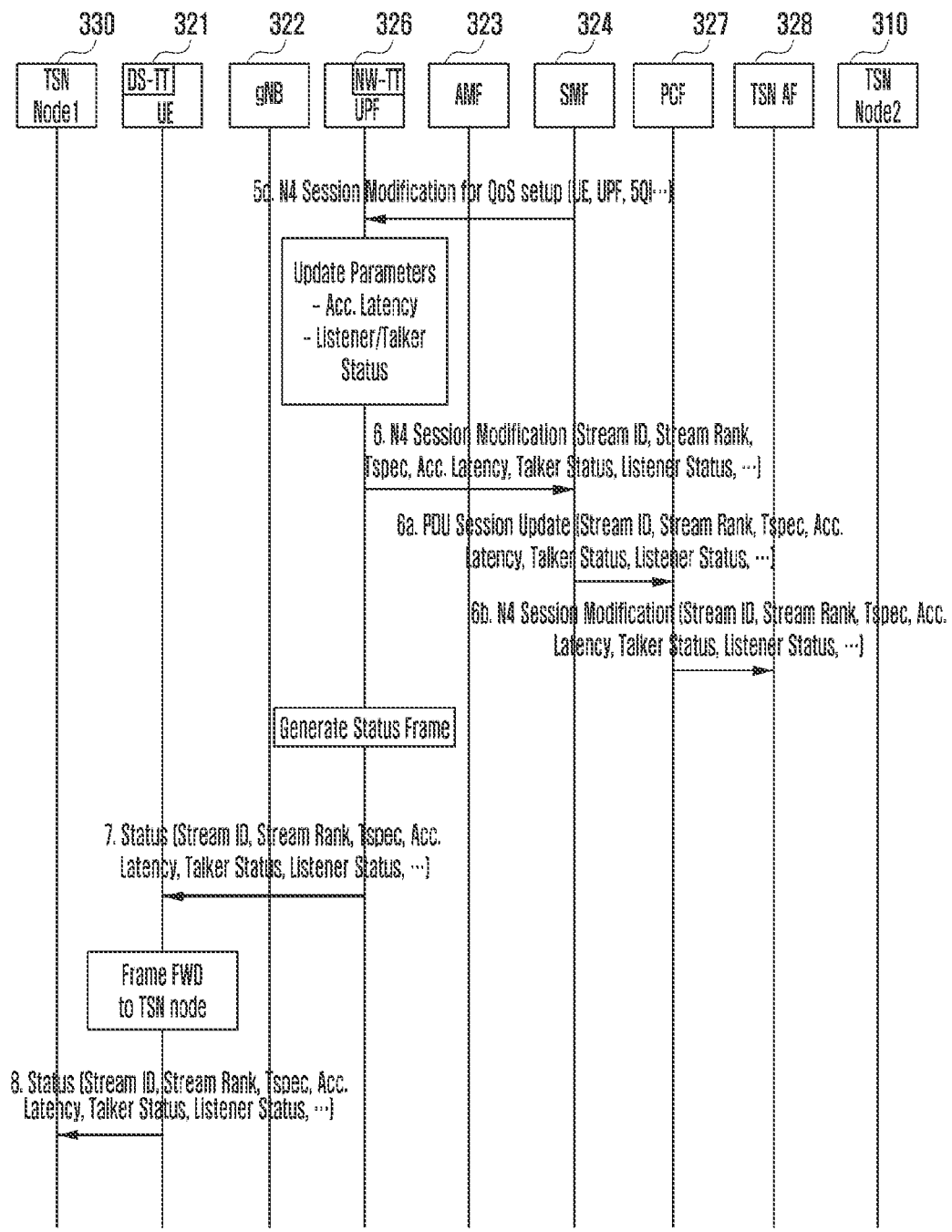
FIG. 9B illustrates signal flow in a mobile communication network in a downlink operation of the third method; according to the disclosure.

FIG. 9A illustrates signal flow in a mobile communication network in a downlink operation of method 3 according to the disclosure, and FIG. 9B illustrates signal flow in a mobile communication network in a downlink operation of method 3 according to the disclosure. The foregoing description of the UE in FIG. 9A and FIG. 9B may be equally applied to FIG. 4A and FIG. 4B. Further, as described above, it is assumed that a UPF includes an NW-TT. In the foregoing description with reference to FIG. 3A and FIG. 3B, an RAN is illustrated as a base station on a mobile communication network. In the following description, since a base station in a 5G network is described, a gNB is illustrated, and like reference numerals are used.

In operation 1, a PDU session may be established between the DS-TT/UE 321 and the NW-TT/UPF 326, and the NW-TT/UPF 326 may transmit bridge management information to a TSN AF 328. Then, traffic from external TSN nodes actually flows to the DS-TT/UE 321 through the established PDU session.

In operation 2, a synchronization procedure may be performed using a 5G network positioned between a first TSN node 330 and a second TSN node 310. This synchronization procedure may refer to synchronization with a TSN clock, and the bridge management information may be updated if necessary.

In operation 3, the NW-TT/UPF 326 may receive a talker/status/listener frame from the second TSN node 310 and may interpret the same. This interpretation operation may be the same as that described above.

In operations 4/4a/4b, the NW-TT/UPF 326 may transmit a QoS setup request to the TSN AF 328 if necessary. In operation 4, the NW-TT/UPF 326 may provide information, such as UE MAC/port information, NW-TT MAC/port information, and Tspec, to an SMF 324 using an N4 report message. In operation 4a, the SMF 324 may provide the foregoing pieces of information to a PCF 327 using a QoS request message. In operation 4b, the PCF 327 may provide the foregoing pieces of information to the TSN AF 328 using an update message for QoS setup.

The TSN AF 328 may provide a response message to the message received through operations 4/4a/4b to the PCF 327 (operation 5), the SMF 324 (operation 5a), the NW-TT/UPF 326, the gNB 322, and the UE 321 (operation 5b). An update message for QoS setup may be used in operation 5, a PDU session update message for QoS setup may be used in operation 5a, and a PDU session modification message for QoS setup may be used in operation 5b. In operation 5c, the SMF 324 may transmit updated parameters to the NW-TT/UPF 326 using an N4 session modification message for QoS setup.

The NW-TT/UPF 326 may update the received parameters. For example, in a case illustrated in FIG. 2D, a 5GS logical bridge also needs to allocate a resource for supporting a stream. The NW-TT/UPF 326 may update the parameters, such as a talker status, a listener status, and accumulated latency, as described in FIG. 2B and FIG. 2D. As described above, the parameters may be QoS information required for the mobile communication system to operate as one TSN node.

In operations 6/6a/6b, the NW-TT/UPF 326 may transmit information, such as a stream ID, a stream rank, Tspec, accumulated latency, a talker status, and a listener status, to the TSN AF 328. Operations 6/6a/6b may include paths necessary for transmission from the NW-TT/UPF 326 to the TSN AF 328, for example, transmission to the TSN AF 328 (operation 6b) via the SMF 324 (operation 6) and via the PCF 327 (operation 6a). Operations 6/6a/6b are for storing the information for a case where a plurality of PDU sessions is involved and may thus be omitted when a single PDU session is involved.

The NW-TT/UPF 326 may generate a status frame reflecting the updated information and may transmit the status frame to the DS-TT/UE in operation 7. Upon receiving the status frame in operation 7, the DS-TT/UE 321 may transmit the received status frame to an external TSN node, for example, the first TSN node 330, without separately interpreting the status frame in operation 8. That is, in this operation, an updated frame, which is a new frame obtained by updating the frame received in operation 3 using additional information, may be transmitted to the first TSN node 330.

Figure 10:
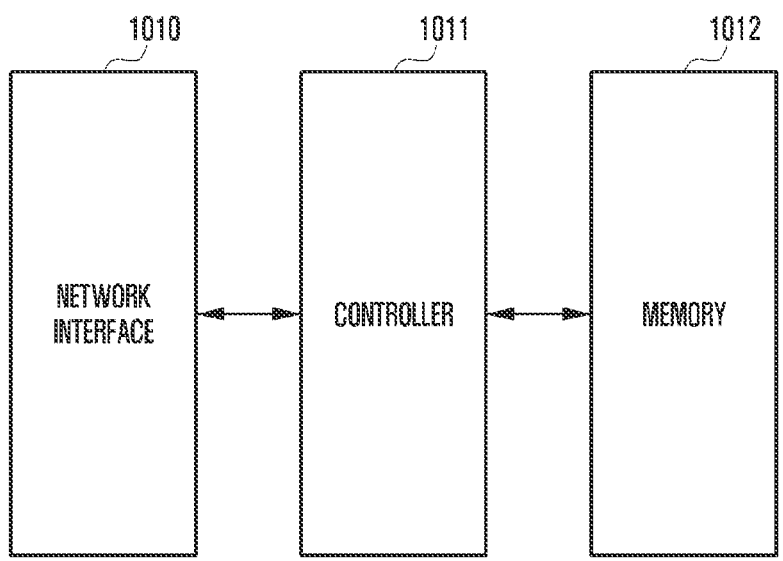
FIG. 10 is a functional block diagram illustrating a network function (NF) of a wireless communication network according to an embodiment.

FIG. 10 is a functional block diagram illustrating an NF of a wireless communication network according to an embodiment.

Referring to FIG. 10, a network interface 1010 may communicate with another network entity and/or at least one TSN node of a mobile communication core network. For example, when the NF is an RAN 322, the network interface 1010 may communicate with an SMF 324, an AMF 323, or the like. In another example, when the NF is a UPF 326, the network interface 1010 may communicate with an RAN 322, an SMF 324, or the like. Instill another example, when the NF is a TSN AF 328, the network interface 1010 may communicate with a CNC 130 of a TSN and/or at least one node of a TSN system and may simultaneously communicate with an NEF 329 and/or a PCF 327. Similarly, when the NF is a specific network entity, the network interface 1010 may communicate with another entity of the mobile communication network and/or at least one node of the TSN system. Therefore, the network interface 1010 disclosed herein may include the function of an NW-TT in a specific case, for example, when included in a UPF 326.

A controller 1011 may be configured as at least one processor or/and a program to perform the operation of the NF. For example, when the NF is a UPF 326, the controller 1011 may perform the foregoing operation of the UFF 326. In another example, when the NF is a TSN AF 328, the controller 1011 may perform the foregoing operation of the TSN AF 328. When the NF is a different network entity, the controller 1011 may perform control necessary for the foregoing corresponding operation.

A memory 1012 may store a program and various types of control information required by the controller 1011 and may store other information disclosed herein.

The NF may further include various interfaces for connection with an operator in addition to the components described above. In the disclosure, there is no particular restriction on additional components.

Figure 11:
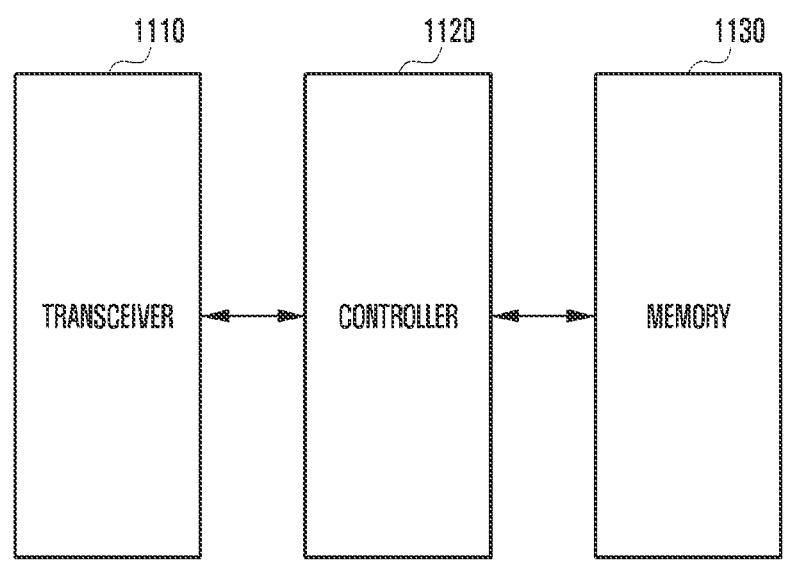
FIG. 11 is an internal functional block diagram illustrating a terminal according to an embodiment.

FIG. 11 is an internal functional block diagram illustrating a terminal according to an embodiment.

Referring to FIG. 11, the terminal 321 may include a transceiver 1110, a controller 1120, and a memory 1130. The terminal 321 may additionally include more components depending on a configuration method. For example, the terminal 321 may further include various additional devices, such as a display for a user interface, an input unit, and a sensor. In the disclosure, there is no particular restriction on additional components.

The transceiver 1110 may be connected to a base station 322 through a wireless channel based on the embodiments described with reference to FIG. 1 to FIG. 9 and may transmit and receive a signal and/or a message to and from the base station 322. When the terminal 321 communicates with a 5G network, the transceiver 1110 may be a device capable of transmission/reception with a 5G communication network. The transceiver 1110 may include a communication processor if necessary. When the transceiver 1110 does not include a communication processor, all signals and/or messages may be processed by the controller.

According to the disclosure, the transceiver 1110 may perform communication with at least one node of a TSN system. Here, at least one node of the TSN system may be one of a talker and/or a listener or a different bridge as described above. Accordingly, the transceiver 1110 according to the disclosure may include both a component for communicating with a mobile communication system in a wireless manner and a DS-TT.

The controller 1120 may control the basic operation of the terminal 321 and may control reception, delivery, transmission, and storage of the messages described above.

The memory 1130 may store various types of data necessary for control of the terminal 321 and may include an area for storing a message received the base station 322 and/or a specific NF of a core network for communication using the network slice described above.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for transmitting a time-sensitive networking (TSN) frame by a user plane function in a mobile communication network, the method comprising:
   establishing a packet data unit (PDU) session with a user equipment (UE) communicating with a first TSN node;
   synchronizing the first TSN node and a second TSN node;
   interpreting a first frame received from the first TSN node through the UE, the first frame including TSN data and control information;
   transmitting, to a TSN application function (AF), the control information of the first frame using a message of the mobile communication network;
   receiving, from the TSN AF through a session management function (SMF), a session modification message for a quality of service (QoS) required by the first frame;
   receiving, from the TSN AF through the SMF, a parameter update message including a talker status, a listener status, and an accumulated latency value;
   generating a second frame based on the parameter update message; and
   transmitting the generated second frame to the second TSN node,
   wherein the talker status indicates whether there is a talker,
   wherein the listener status indicates whether there is a listener, and
   wherein the accumulated latency value indicates expected maximum latency time.

2. The method of claim 1, wherein the control information included in the first frame comprises at least one of a stream identifier (ID), a stream rank indicating a priority of a stream, a traffic specification indicating a unique feature of traffic, an accumulated latency of TSN nodes, a talker status, and a listener status.

3. The method of claim 1, wherein the message of the mobile communication network used to transmit the control information of the first frame is an N4 session update message.

4. The method of claim 1, wherein the first frame and the second frame are Ethernet frames, and
   wherein the second frame includes the data of the first frame and control information received from the TSN AF.

5. A method for transmitting a time-sensitive networking (TSN) frame by a user plane function in a mobile communication network, the method comprising:
   establishing a packet data unit (PDU) session with a user equipment (UE) communicating with a first TSN node;
   synchronizing the first TSN node and a second TSN node connected through a core network of the mobile communication network;
   interpreting a first frame received from the second TSN node, the first frame including TSN data and control information;
   transmitting, to a TSN application function (AF), the control information of the first frame using a message of the mobile communication network;
   receiving, from the TSN AF through a session management function (SMF), a session modification message for a quality of service (QoS) required by the first frame;
   receiving, from the TSN AF through the SMF, a parameter update message including a talker status, a listener status, and an accumulated latency value;
   generating a second frame based on the parameter update message; and
   transmitting the generated second frame to the first TSN node,
   wherein the talker status indicates whether there is a talker,
   wherein the listener status indicates whether there is a listener, and
   wherein the accumulated latency value indicates expected maximum latency time.

6. The method of claim 5, wherein the control information included in the first frame comprises at least one of a stream identifier (ID), a stream rank indicating a priority of a stream, a traffic specification indicating a unique feature of traffic, an accumulated latency of TSN nodes, a talker status, and a listener status.

7. The method of claim 5, wherein the message of the mobile communication network used to transmit the control information of the first frame is an N4 session update message.

8. The method of claim 5, wherein the first frame and the second frame are Ethernet frames, and
   wherein the second frame includes the data of the first frame and control information received from the TSN AF.

9. A user plane function (UPF) for transmitting a time-sensitive networking (TSN) frame in a mobile communication network, the UPF comprising:
   a network interface configured to communicate with at least one application function (AF) of the mobile communication network and at least one node of TSN;
   a memory configured to store TSN data, control information, and information about a PDU session with a user equipment (UE); and
   a controller configured to:
      establish a packet data unit (PDU) session with a UE communicating with a first TSN node;
      synchronize the first TSN node and a second TSN node;
      interpret a first frame including TSN data and control information transmitted from the first TSN node through the UE when the first frame is received through the network interface;
      control the network interface to transmit the control information of the first frame to a TSN AF using a message of the mobile communication network;
      control the network interface to receive a session modification message for a quality of service (QoS) required by the first frame transmitted by the TSN AF from a session management function (SMF);
      control the network interface to receive a parameter update message including a talker status, a listener status, and an accumulated latency value from the TSN AF through the SMF;
      generate a second frame based on the parameter update message; and
      control the network interface to transmit the generated second frame to the second TSN node,
   wherein the talker status indicates whether there is a talker, wherein the listener status indicates whether there is a listener, and wherein the accumulated latency value indicates expected maximum latency time.

10. The UPF of claim 9, wherein the control information included in the first frame comprises at least one of a stream identifier (ID), a stream rank indicating a priority of a stream, a traffic specification indicating a unique feature of traffic, an accumulated latency of TSN nodes, a talker status, and a listener status.

11. The UPF of claim 9, wherein the message of the mobile communication network used to transmit the control information of the first frame is an N4 session update message.

12. The UPF of claim 9, wherein the first frame and the second frame are Ethernet frames, and wherein the second frame includes the data of the first frame and control information received from the TSN AF.

13. A user plane function (UPF) for transmitting a time-sensitive networking (TSN) frame in a mobile communication network, the UPF comprising:

a network interface configured to communicate with at least one application function (AF) of the mobile communication network and at least one node of TSN;

a memory configured to store TSN data, control information, and information about a packet data unit (PDU) session with a user equipment (UE); and a controller configured to:

interpret a third frame including TSN data and control information when the third frame is received from a second TSN node;

control the network interface to transmit the control information of the third frame to a TSN AF using a message of the mobile communication network;

control the network interface to receive a session modification message for a quality of service (QoS) required by the third frame transmitted by the TSN AF from a session management function (SMF);

control the network interface to receive a parameter update message including a talker status, a listener status, and an accumulated latency value;

generate a fourth frame based on the parameter update message; and control the network interface to transmit the generated fourth frame to a first TSN node, wherein the talker status indicates whether there is a talker, wherein the listener status indicates whether there is a listener, and wherein the accumulated latency value indicates expected maximum latency time.

14. The UPF of claim 13, wherein the control information included in the first frame includes at least one of a stream identifier (ID), a stream rank indicating a priority of a stream, a traffic specification indicating a unique feature of traffic, an accumulated latency of TSN nodes, a talker status, and a listener status.

15. The UPF of claim 13, wherein the message of the mobile communication network used to transmit the control information of the first frame is an N4 session update message, wherein the first frame and the second frame are Ethernet frames, and wherein the second frame includes the data of the first frame and control information received from the TSN AF.

\* \* \* \* \*